(12) United States Patent
Iwabuchi et al.

(10) Patent No.: US 7,495,501 B2
(45) Date of Patent: Feb. 24, 2009

(54) CHARGE PUMP CIRCUIT AND SEMICONDUCTOR DEVICE HAVING THE SAME

(75) Inventors: Tomoyuki Iwabuchi, Yokosuka (JP); Tatsuro Ueno, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 64 days.

(21) Appl. No.: 11/643,872

(22) Filed: Dec. 22, 2006

(65) Prior Publication Data

US 2007/0146055 A1 Jun. 28, 2007

(30) Foreign Application Priority Data

Dec. 27, 2005 (JP) .............................. 2005-376634

(51) Int. Cl.
*G05F 1/10* (2006.01)
(52) U.S. Cl. ...................... 327/536; 327/589; 363/59; 363/60
(58) Field of Classification Search ................. 327/536, 327/390, 589; 363/59, 60
See application file for complete search history.

(56) References Cited

U.S. PATENT DOCUMENTS 5,438,504 A * 8/1995 Menegoli ..................... 363/60

| | | | |
|---|---|---|---|
| 6,603,346 B2 | 8/2003 | Sawada et al. | |
| 6,724,241 B1 * | 4/2004 | Bedarida et al. ............ | 327/536 |
| 7,102,422 B1 | 9/2006 | Sawada et al. | |

FOREIGN PATENT DOCUMENTS

| EP | 0 678 970 | 10/1995 |
|---|---|---|
| EP | 1 134 879 | 9/2001 |
| EP | 1 237 266 | 9/2002 |
| JP | 07-099772 | 4/1995 |
| JP | 07-327357 | 12/1995 |
| JP | 2001-136733 | 5/2001 |

* cited by examiner

*Primary Examiner*—An T Luu
(74) *Attorney, Agent, or Firm*—Eric J. Robinson; Robinson Intellectual Property Law Office, P.C.

(57) ABSTRACT

A conventional charge pump circuit requires a step-up circuit or the like for turning on or off a transistor. Therefore, it has a problem of an increase in circuit scale, which leads to increases in circuit area and power consumption. One feature is to provide a charge pump circuit including a first transistor, a switch, a first capacitor, a second capacitor, and an inverter, in which one electrode of the first transistor is connected to a first potential, an output side of the inverter is connected to the other electrode of the first transistor and one side of the switch through the first capacitor, the other side of the switch is connected to a second potential through the second capacitor.

23 Claims, 15 Drawing Sheets

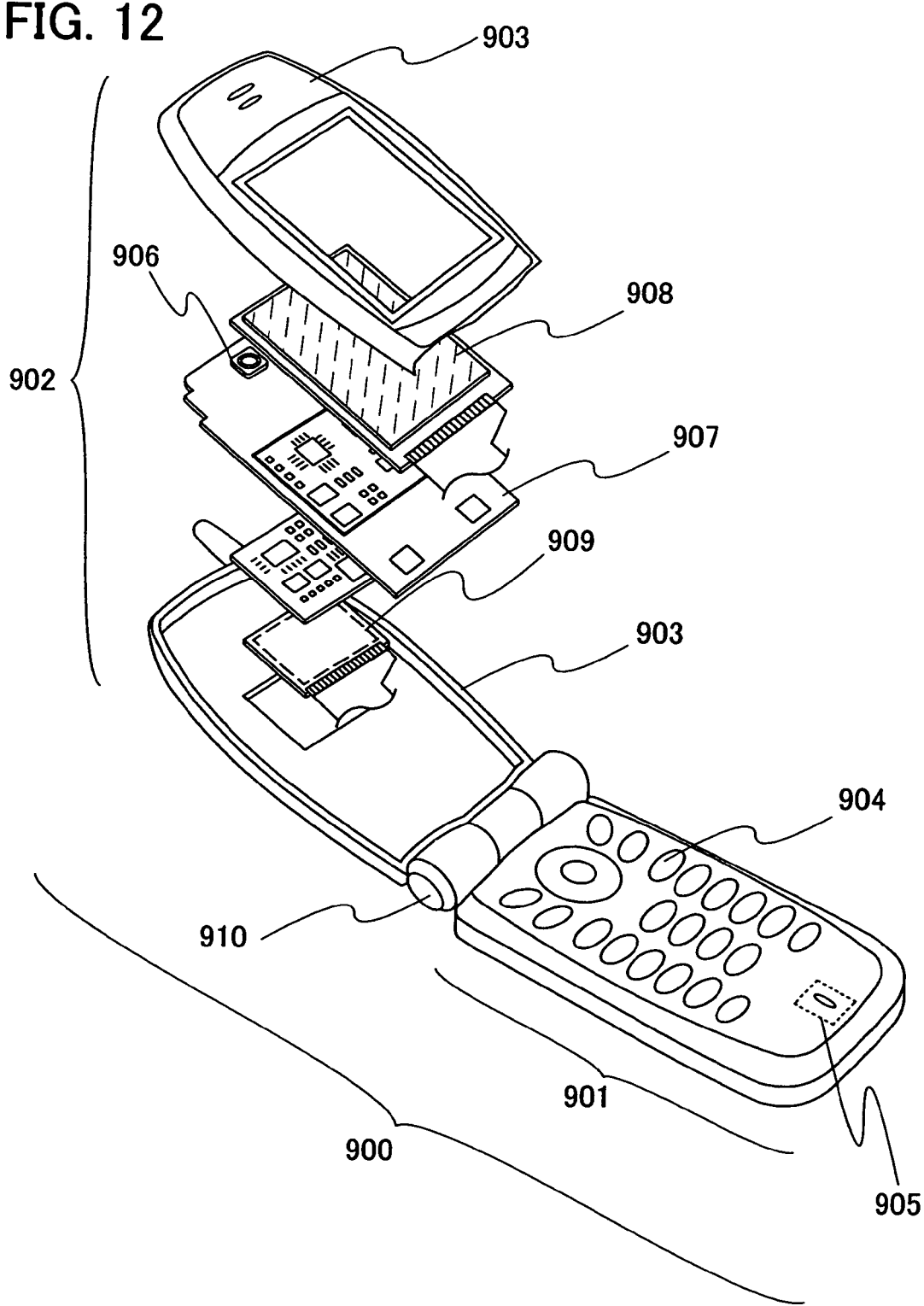

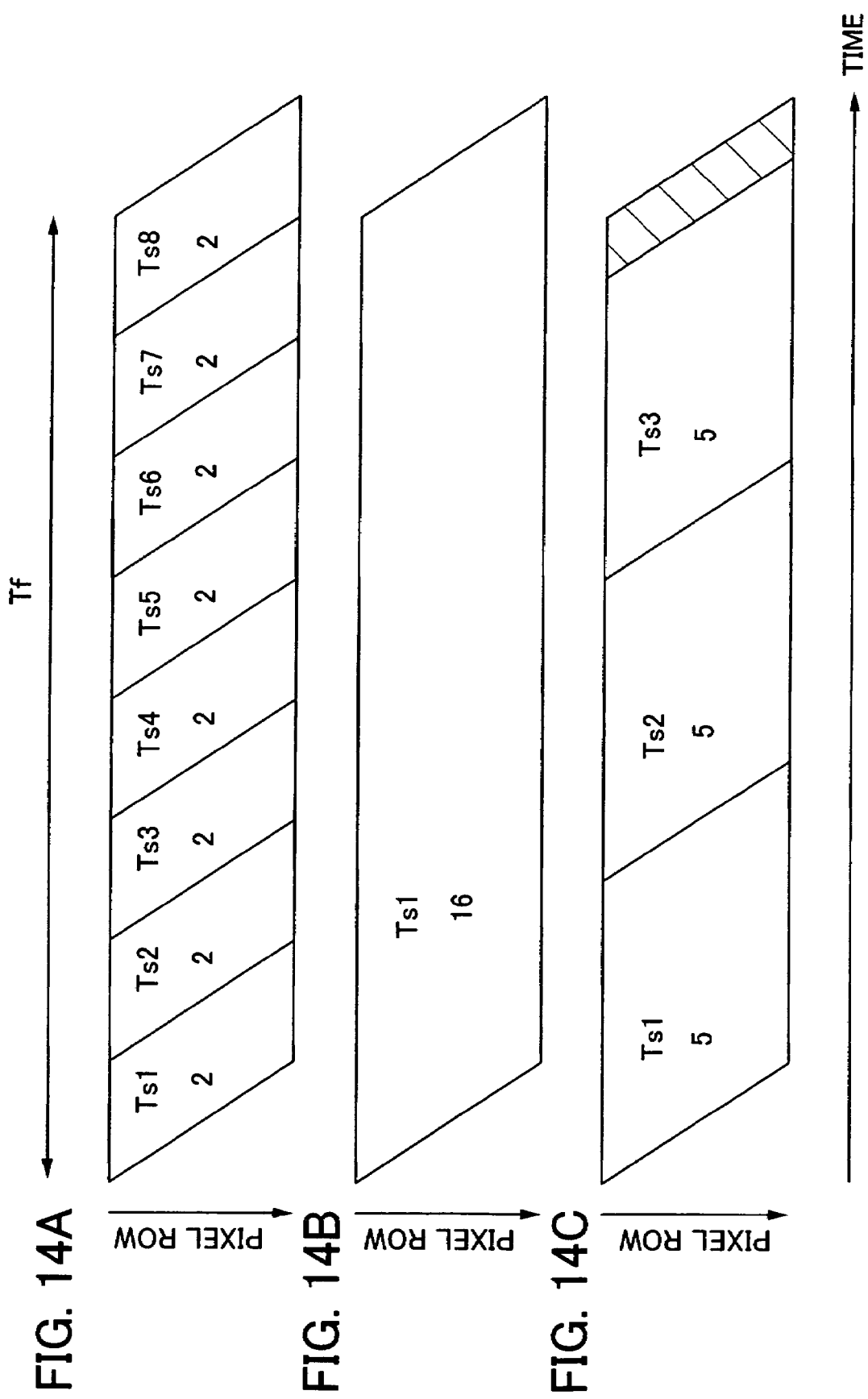

CHARGE PUMP CIRCUIT AND SEMICONDUCTOR DEVICE HAVING THE SAME

BACKGROUND OF THE INVENTION

1. Field of the Invention

The present invention relates to a charge pump circuit having a novel structure, more specifically, a semiconductor device using a charge pump circuit as a step-up circuit or a step-down circuit.

2. Description of the Related Art

A step-up circuit includes that using a coil and that using a capacitor. The one using a capacitor is generally called a charge pump. A conventional charge pump has a structure in which two diodes are connected in series and has a problem of a drop in output voltage by the same amount as a threshold voltage of the diode. In order to solve this problem, another structure using a switch instead of a diode has been proposed (see References 1: Japanese Published Patent Application No. 2001-136733, Reference 2: Japanese Published Patent Application No. H07-327357, and Reference 3: Japanese Published Patent Application No. H07-099772).

In order to realize the circuit disclosed in Reference 1, a circuit for stepping up a voltage to be equal to or higher than an external power supply voltage is needed to turn on or off a switch including a transistor (hereinafter also referred to as a TFT).

In general, a transistor is turned on by inputting Low potential to a gate terminal when the transistor is a p-channel transistor. This Low potential is lower than the potential of a source terminal of the p-channel transistor, and a potential difference between the Low potential and the potential of the source terminal of the p-channel transistor is equal to or lower than a threshold voltage of the p-channel transistor. Further, an n-channel transistor is turned on by inputting High potential. This High potential is higher than the potential of a source terminal of the n-channel transistor, and a potential difference between the High potential and the potential of the source terminal of the n-channel transistor is equal to or higher than a threshold voltage of the n-channel transistor. Note that the threshold voltage of a normal p-channel transistor is lower than 0 V. Further, the threshold voltage of a normal n-channel transistor is higher than 0 V. Therefore, when a gate-source voltage of a transistor is 0 V, the transistor is turned off and a current does not flow. Such a transistor is referred to as an enhancement mode transistor (also referred to as a normally-off transistor).

On the other hand, there is a transistor in which a current flows even when a gate-source voltage thereof is 0 V. Note that such a transistor is referred to as a depletion mode transistor (also referred to as a normally-on transistor).

In general, a transistor is manufactured to be normally off. In a charge pump included in a display device, if a switch including a transistor is normally off, an operating voltage of the transistor is increased. Therefore, the output of a step-up circuit from outside also needs to be increased. Accordingly, a circuit scale is increased, which leads to an increase in circuit area, a decrease in yield, and an increase in power consumption.

In addition, a conventional charge pump switching element as described above has the following problem when incorporated in a display device. A normal charge pump does not function to feed back an output voltage to stabilize output like other switching regulators. Therefore, the conventional charge pump switching element has a problem of loss of power source stability when a current load is heavy and an output current is increased.

SUMMARY OF THE INVENTION

It is an object of the present invention to provide a charge pump circuit having a structure different from those in the above references, and a semiconductor device using the charge pump circuit.

In view of the above object, one aspect of the present invention is a semiconductor device including a charge pump circuit having the following structure.

FIG. 1A shows an example of the structure. In the structure of FIG. 1A, a first transistor 101 is formed to be normally on and to have n-channel type conductivity by adjusting channel doping concentration, for example, reducing the amount of boron in the case of adding boron or not performing channel doping. This can realize a charge pump circuit which does not require a step-up circuit and has resistance to variation in threshold voltage.

One feature of a semiconductor device having a charge pump circuit of the present invention is that the charge pump circuit includes a first transistor 101, a switch 102, a first capacitor 103, a second capacitor 104, and an inverter 105, in which one electrode of the first transistor is connected to a first potential, an input side of the inverter is connected to a gate electrode of the first transistor, an output side of the inverter is connected through the first capacitor to the other electrode of the first transistor and to one side of the switch, and the other side of the switch is connected to a second potential through the second capacitor.

The switch is formed using an n-channel or p-channel transistor, and the n-channel transistor is normally on.

One feature of the switch in the above charge pump circuit is to include a second transistor, a third transistor, and a fourth transistor, in which one electrode of the fourth transistor is connected to the second potential, one electrode of the third transistor, one electrode of the second transistor, and the other electrode of the first transistor are connected to the other, the other electrode of the third transistor and the other electrode of the fourth transistor are connected to each other, and the other electrode of the second transistor is connected to the second potential through the second capacitor.

Another feature of the semiconductor device having the above structure is that the first transistor has n-channel type conductivity, the first potential to which the one electrode of the first transistor is connected is a high-level potential, the second transistor has n-channel type conductivity, the third transistor has p-channel type conductivity, the fourth transistor has n-channel type conductivity, the second potential to which the one electrode of the fourth transistor is connected is a low-level potential, and the first transistor or the second transistor is normally on.

One feature of a semiconductor device having a charge pump circuit with another structure is that the charge pump circuit includes a first transistor, a switch, a first capacitor, a second capacitor, and a first inverter, in which the switch includes a second transistor, a third transistor, a second inverter, a third inverter, a fourth inverter, and a third capacitor; one electrode of the first transistor is connected to a first potential; an input side of the first inverter is connected to a gate electrode of the first transistor; an output side of the first inverter is connected to the other electrode of the first transistor through the first capacitor; one electrode of the third transistor is connected to the first potential; an output side of the second inverter is connected to an input side of the fourth inverter and a gate electrode of the third transistor through the third inverter; an output side of the fourth inverter is connected to the other electrode of the third transistor and a gate electrode of the second transistor through the third capacitor; one electrode of the second transistor is connected to the other electrode of the first transistor; and the other electrode of the second transistor is connected to a second potential through the second capacitor.

Another feature of the semiconductor device having the above structure is that the first transistor has n-channel type conductivity, the first potential to which the one electrode of the first transistor is connected is a high-level potential, the second transistor has p-channel type conductivity, the third transistor has n-channel type conductivity, the second potential to which the other electrode of the second transistor is connected through the second capacitor is a low-level potential, and the first transistor or the third transistor is normally on.

One feature of a semiconductor device having a charge pump circuit with another structure is that the charge pump circuit includes a first transistor, a switch, a first capacitor, a second capacitor, and a first inverter, in which the switch includes a second transistor, a third transistor, a fourth transistor, a second inverter, a third inverter, a fourth inverter, and a third capacitor; one electrode of the first transistor is connected to a first potential; an input side of the first inverter is connected to a gate electrode of the first transistor; an output side of the first inverter is connected to the other electrode of the first transistor through the first capacitor; one electrode of the third transistor is connected to the first potential; an output side of the second inverter is connected to an input side of the fourth inverter and a gate electrode of the third transistor through the third inverter; an output side of the fourth inverter is connected to one electrode of the fourth transistor and a gate electrode of the second transistor through the third capacitor; one electrode of the second transistor is connected to the other electrode of the first transistor and a gate electrode of the fourth transistor; and the other electrode of the second transistor is connected to the other electrode of the fourth transistor and to a second potential through the second capacitor.

Another feature of the display device having the above structure is that the first transistor has n-channel type conductivity, the first potential to which the one electrode of the first transistor is connected is a high-level potential, the second transistor has p-channel type conductivity, the third transistor has n-channel type conductivity, the fourth transistor has p-channel type conductivity, the second potential to which the other electrode of the second transistor is connected through the second capacitor is a low-level potential, and the first transistor or the third transistor is normally on.

A feature is that output voltages of the charge pump circuits having the above-described structures are all stepped up.

Another feature is that, in the above-mentioned charge pump circuit, the output voltage of the charge pump circuit is stepped down by setting the first potential to which the one electrode of the first transistor is connected to be a low-level potential, setting the first transistor to have p-channel type conductivity and to be normally on, changing the conductivity of each transistor included in the switch from a p-channel type to an n-channel type or from an n-channel type to a p-channel type, and changing each potential connected to the transistor from a low-side potential to a high-side potential or from a high-side potential to a low-side potential.

Another feature of the above-described charge pump circuit including the inverters is that a clock signal is inputted to the inverters.

Another feature of the above-described charge pump circuit of the present invention is that the transistor is a thin film transistor (TFT).

The present invention can provide a semiconductor device including a step-up or step-down circuit having a novel structure. Accordingly, a reduction in power consumption, an improvement in output current and output potential, and a reduction in circuit area due to a reduction in circuit scale can be realized.

In addition, since the charge pump circuit of the present invention can be formed using a thin film transistor, frequencies of clock signals of a liquid crystal display device, a display device including a light emitting element (hereinafter also referred to as a light emitting device), or another display device can be selected in accordance with display mode, and the power consumption of the display device can be reduced.

Moreover, an external circuit can be simplified by forming the charge pump circuit and a circuit which is needed for a semiconductor device over the same substrate. Therefore, the number of circuit parts can be reduced, and cost reduction can be realized.

BRIEF DESCRIPTION OF DRAWINGS

FIG. 12 is a diagram showing a structure of a cellular phone according to Embodiment Mode 13.

FIGS. 14A to 14C are diagrams illustrating driving methods of the cellular phone according to Embodiment Mode 13.

DETAILED DESCRIPTION OF THE INVENTION

Hereinafter, embodiment modes of the present invention are explained in accordance with attached drawings. However, the present invention can be implemented in many different modes, and it is easily understood by those skilled in the art that the modes and the details thereof can be variously modified without departing from the spirit and the scope of the present invention. Therefore, the present invention is not interpreted as being limited to the description of the embodiment modes.

Note that in a thin film transistor including as an active layer a silicon thin film formed over an insulating substrate or the like, it is difficult to distinguish between a source electrode and a drain electrode due to its structure. Therefore, one of a source electrode and a drain electrode is referred to as a first electrode and the other is referred to as a second electrode except when the source electrode and the drain electrode particularly need to be distinguished. In general, in an n-channel transistor, an electrode with a low-level potential is a source electrode and that with a high-level potential is a drain electrode; in a p-channel transistor, an electrode with a high-level potential is a source electrode and that with a low-level potential is a drain electrode. Therefore, the above description applies when the description of a gate-source voltage or the like is given in explaining circuit operation.

EMBODIMENT MODE 1

Figure 1A:
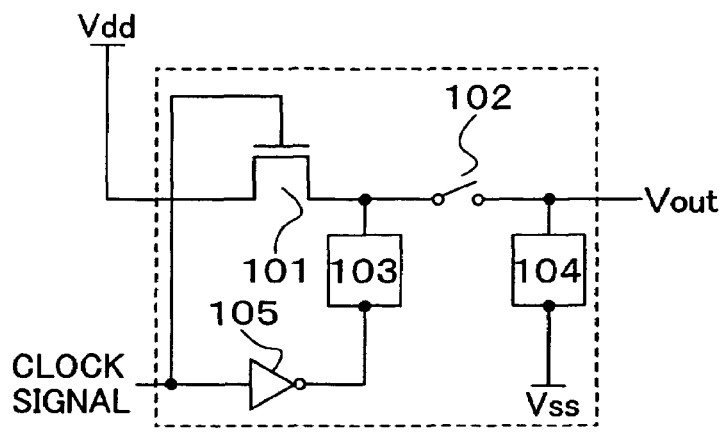
FIGS. 1A to 1C are diagrams showing structural examples of charge pump circuits of the present invention and operation timing.
Figure 1B:
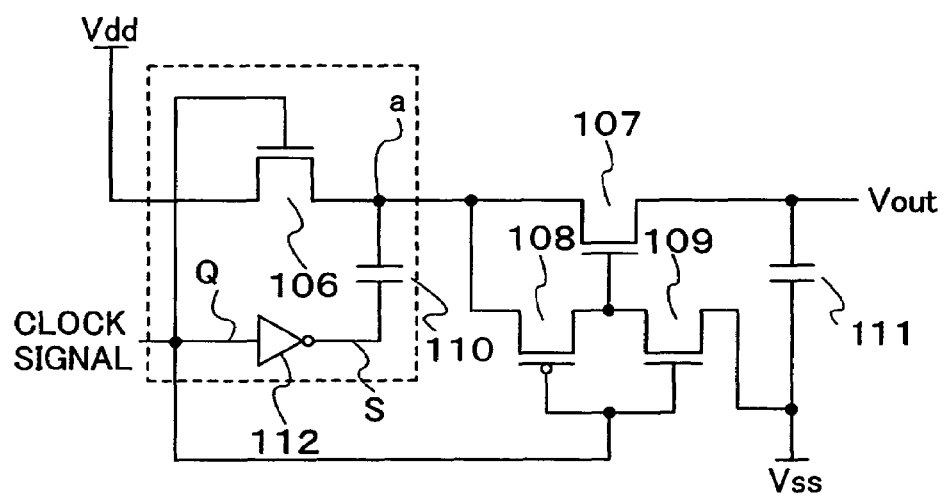

FIG. 1B shows the structure of a charge pump circuit of this embodiment mode of the present invention. The charge pump circuit of this embodiment mode of the present invention includes elements such as a first transistor 106, a second transistor 107, a third transistor 108, a fourth transistor 109, a first capacitor 110, a second capacitor 111, and an inverter 112. In this embodiment mode, the conductivity of the first transistor 106, the second transistor 107, and the fourth transistor 109 is set to an n-channel type. In addition, that of the third transistor 108 is set to a p-channel type. Further, one feature of the first transistor 106 and the second transistor 107 is to be normally on.

Next, the connection relation of each element is explained.

A first electrode of the first transistor 106 is connected to Vdd at a high-level potential. An output side (point S) of the inverter 112 is connected through the first capacitor 110 to a second electrode of the first transistor 106, a first electrode of the second transistor 107, and a first electrode of the third transistor 108. That connection point is indicated by "a" in FIG. 1B and is hereinafter referred to as a "node a". An input side (point Q) of the inverter 112 is connected to gate electrodes of the first transistor 106, the third transistor 108, and the fourth transistor 109. In addition, second electrodes of the third transistor 108 and the fourth transistor 109 are connected to each other, a first electrode of the fourth transistor 109 is connected to Vss at a low-level potential, and a second electrode of the second transistor 107 is connected to Vss through the second capacitor 111.

The operation of a charge pump having such a circuit structure is explained. Note that, for simple explanation, a high-level potential (High potential) is set to 5 V and a low-level potential (Low potential) is set to 0 V; however, this embodiment mode is not limited thereto. A clock signal, of which High potential is 5 V and Low potential is 0 V, is inputted to the input side (point Q) of the inverter 112. It is needless to say that the values are practically not limited thereto. For example, when High potential (5 V) is inputted to the input side (point Q) of the inverter 112, 0 V is inputted to the first capacitor 110, and High potential is inputted to each of the gate electrodes of the first transistor 106, the third transistor 108, and the fourth transistor 109. At this time, the first transistor 106 is turned on and the potential of the node a is 5 V. Simultaneously, High potential (5 V) is inputted to the gate electrodes of the third transistor 108 and the fourth transistor 109, so that the third transistor 108 is turned off and the fourth transistor 109 is turned on. Therefore, the second transistor 107, to the gate electrode of which 0 V is inputted, is turned off, and a predetermined charge is accumulated in the first capacitor 110 without leakage.

When Low potential (0 V) is subsequently inputted to the input side (point Q) of the inverter 112, High potential (5 V) is inputted to the first capacitor 110; the first transistor 106, to the gate electrode of which Low potential (0 V) is inputted, is turned off; and the potential of the node a which is twice as much as Vdd (5 V) can be surely obtained without leakage due to the charge accumulated in the first capacitor 110. Note that Low potential (0 V) is inputted to each of the gate electrodes of the third transistor 108 and the fourth transistor 109, so that the fourth transistor 109 is turned off and the third transistor 108 and the second transistor 107 are turned on. Accordingly, an output voltage which is twice as much as Vdd (5 V) can be certainly held as Vout due to the second capacitor 111 and the second transistor 107.

Figure 1C:
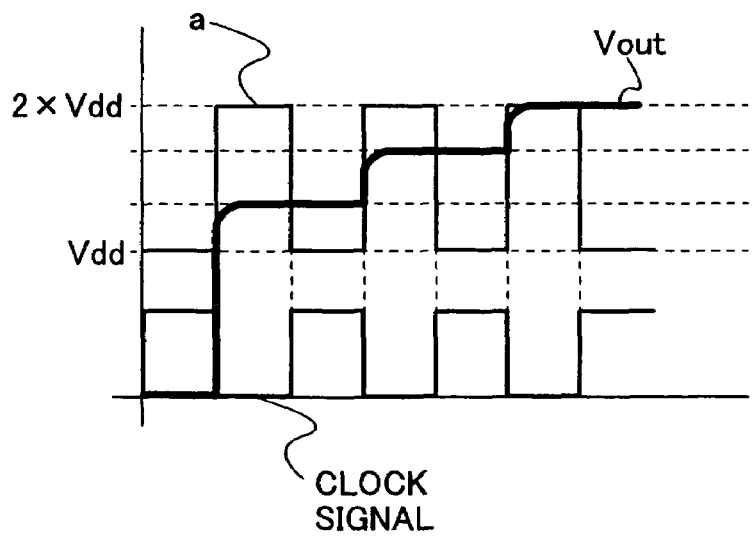

By repeating the above operation, the potential of Vout can be (2×Vdd) (see FIG. 1C).

Note that it is when a load is not connected to Vout that Vout becomes (2×Vdd). When a load (such as a resistor, a capacitor, a transistor, or a circuit) is connected, a current is consumed there, so that Vout becomes lower than (2×Vdd).

This embodiment mode is not limited to the connection relation shown in FIG. 1B. For example, the point S and the point Q are connected to each other through the inverter 112; however, this embodiment mode is not limited thereto.

Instead of the inverter 112, potentials may be applied to the point Q and the point S separately. In that case, the potentials applied to the point Q and the point S are preferably inverted to each other. Note that the potential applied to the point Q and the potential applied to the point S are not necessarily inverted to each other as long as normal operation is conducted.

In this embodiment mode, the High potential applied to the point Q is not necessarily Vdd. It may be a voltage lower than Vdd or a voltage higher than Vdd. In a similar manner, the Low potential applied to the point S is not necessarily 0 V. It may be a voltage lower than 0 V or a voltage higher than 0 V. In a similar manner, the Low potential applied to the point Q may be a voltage lower than 0 V or a voltage higher than 0 V.

Hereinabove, this embodiment mode explains the case where the first and second transistors have n-channel type conductivity and are normally on; however, the conductivity of the transistors is not limited thereto. For example, a circuit structure may be that in which the first and second transistors are set to have p-channel type conductivity and to be normally on by adjusting channel doping amount and one electrode of the first transistor is held at a low-level potential. In that case, the circuit structure is that in which the third and fourth transistors have the conductivity opposite to that shown in the drawing and one electrode of the fourth transistor is held at a high-level potential. As described above, in this embodiment mode, the output voltage of the charge pump circuit can be stepped down by changing the conductivity of each transistor from an n-channel type to a p-channel type or a p-channel type to an n-channel type, and setting the potential of one electrode to a high-level potential or a low-level potential.

In the above-described charge pump circuit, a thin film transistor can be formed as the transistor. Accordingly, the charge pump circuit can be formed over the same substrate as a display device, or a nonvolatile memory such as a flash memory. However, when using a thin film transistor in a charge pump, it is difficult to step up a voltage to a predetermined potential because a thin film transistor has high threshold voltage. In addition, since threshold voltages vary among thin film transistors, potentials to be outputted may vary. Thus, since the output is determined by whether the second transistor is on or off as described above when using the charge pump of this embodiment mode, voltage drop by threshold voltage can be prevented. As a result, the charge pump of this embodiment mode provides a significant effect when using a thin film transistor with a higher threshold voltage than that of a transistor formed of a silicon wafer.

In addition, the charge pump formed using a thin film transistor can be formed over the same substrate as a semiconductor device such as a liquid crystal display device or a light emitting device. In that case, either or both a first capacitor and a second capacitor may be formed over the same substrate as the semiconductor device. The number of parts can be reduced when the charge pump is formed over the same substrate as the semiconductor device. On the other hand, when not formed over the same substrate as the semiconductor device, a capacitor with a large capacitance can be located. Since the second capacitor needs to have a larger capacitance than the first capacitor, the first capacitor which may have a small capacitance can be formed over the same substrate as the semiconductor device to reduce the number of parts and to realize cost reduction. A capacitor with a large capacitance can be located as the second capacitor with a large capacitance by not being formed over the same substrate as the semiconductor device.

EMBODIMENT MODE 2

Figure 2:
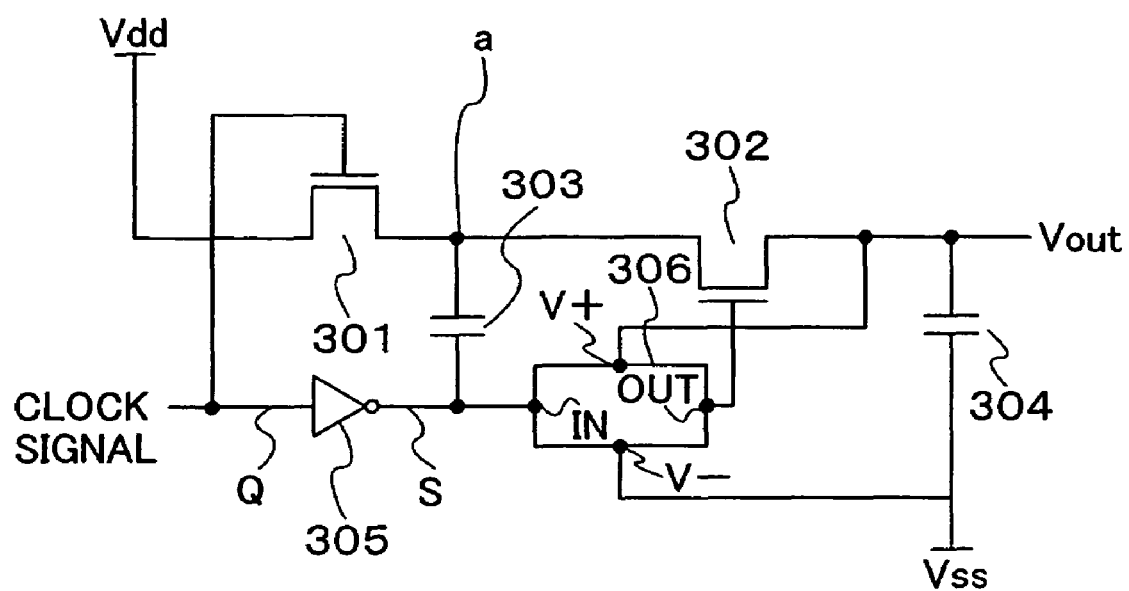
FIG. 2 is a diagram showing a structural example of a charge pump circuit of the present invention.

FIG. 2 shows an example of a structure of another charge pump circuit. The charge pump circuit includes a first transistor 301, a second transistor 302, a first capacitor 303, a second capacitor 304, and an inverter 305, and further includes a step-up circuit 306, which is different from FIG. 1B. The first transistor 301 and the second transistor 302 are set to have n-channel type conductivity. Further, a feature is that the first transistor 301 and the second transistor 302 are set to be normally on.

Next, the connection relation of each element is explained. A first electrode of the first transistor 301 is connected to Vdd at a high-level potential. An output side (point S) of the inverter 305 is connected through the first capacitor 303 to a second electrode of the first transistor 301 and a first electrode of the second transistor 302. The connection point is indicated by "a" in FIG. 2 and is hereinafter referred to as a "node a". In addition, the output side (point S) of the inverter 305 is connected to a gate electrode of the second transistor 302 through an input side (IN in the drawing) and an output side (OUT in the drawing) of the step-up circuit 306. Further, a high-level potential (V+ in the drawing) and a low-level potential (V– in the drawing) of the step-up circuit 306 are connected to Vout and Vss, respectively. A second electrode of the second transistor 302 is connected to Vss at a low-level potential through the second capacitor 304.

This embodiment mode is not limited to the connection relation shown in FIG. 2. For example, the point S and the point Q are connected to each other through the inverter 305; however, this embodiment mode is not limited thereto.

Instead of the inverter 112, potentials may be applied to the point Q and the point S separately. In that case, the potentials applied to the point Q and the point S are preferably inverted to each other. Note that the potential applied to the point Q and the potential applied to the point S are not necessarily inverted to each other as long as normal operation is conducted.

In addition, although the high-level potential (V+) and the low-level potential (V–) of the step-up circuit 306 are connected to Vout and Vss, respectively, this embodiment mode is not limited thereto. For example, a potential corresponding to Vout may be connected to the high-level potential (V+), and a potential corresponding to Vss may be connected to the low-level potential (V–).

Further, although the output (point S) of the inverter 305 is inputted to IN of the step-up circuit 306, any clock signal may be inputted. In other words, it is acceptable as long as the step-up circuit 306 provides such an output that can turn on or off the second transistor at similar timing to FIG. 1B.

The operation of the charge pump having such a circuit structure is the same as the operation explained with reference to FIG. 1B.

Then, in a similar manner to FIG. 1B, as for the potential of Vout, a voltage corresponding to (2×Vdd) can be outputted (see FIG. 1C).

In this embodiment mode, the High potential applied to the point Q is not necessarily Vdd. It may be a voltage lower than Vdd or a voltage higher than Vdd. In a similar manner, the Low potential applied to the point S is not necessarily 0 V. It may be a voltage lower than 0 V or a voltage higher than 0 V. In a similar manner, the Low potential applied to the point Q may be a voltage lower than 0 V or a voltage higher than 0 V.

Hereinabove, this embodiment mode explains the case where the first and second transistors have n-channel type conductivity and are normally on; however, the conductivity of the transistors is not limited thereto. For example, a circuit structure may be that in which the first and second transistors are set to have p-channel type conductivity and to be normally on by adjusting channel doping amount and one electrode of the first transistor is held at a low-level potential. As described above, in this embodiment mode, the output voltage of the charge pump circuit can be stepped down by changing the conductivity of each transistor from an n-channel type to a p-channel type or a p-channel type to an n-channel type, and setting the potential of one electrode to a high-level potential or a low-level potential.

In the above-described charge pump circuit, a thin film transistor can be formed as the transistor. Accordingly, the charge pump circuit can be formed over the same substrate as a display device, or a nonvolatile memory such as a flash memory. However, when using a thin film transistor in a charge pump, it is difficult to step up a voltage to a predetermined potential because a thin film transistor has high threshold voltage. In addition, since threshold voltages vary among thin film transistors, potentials to be outputted may vary. Thus, since the output is determined by whether the second transistor is on or off as described above when using the charge pump of this embodiment mode, voltage drop by threshold voltage can be prevented. As a result, the charge pump of this embodiment mode provides a significant effect when using a thin film transistor with a higher threshold voltage than that of a transistor formed of a silicon wafer.

In addition, the charge pump formed using a thin film transistor can be formed over the same substrate as a semiconductor device such as a liquid crystal display device or a light emitting device. In that case, either or both a first capacitor and a second capacitor may be formed over the same substrate as the semiconductor device. The number of parts can be reduced when the charge pump is formed over the same substrate as the semiconductor device. On the other hand, when not formed over the same substrate as the semiconductor device, a capacitor with a large capacitance can be located. Since the second capacitor needs to have a larger capacitance than the first capacitor, the first capacitor which may have a small capacitance can be formed over the same substrate as the semiconductor device to reduce the number of parts and to realize cost reduction. A capacitor with a large capacitance can be located as the second capacitor with a large capacitance by not being formed over the same substrate as the semiconductor device.

EMBODIMENT MODE 3

This embodiment mode explains the structure and operation of a charge pump, which are different from those in the above embodiment modes.

Figure 3A:
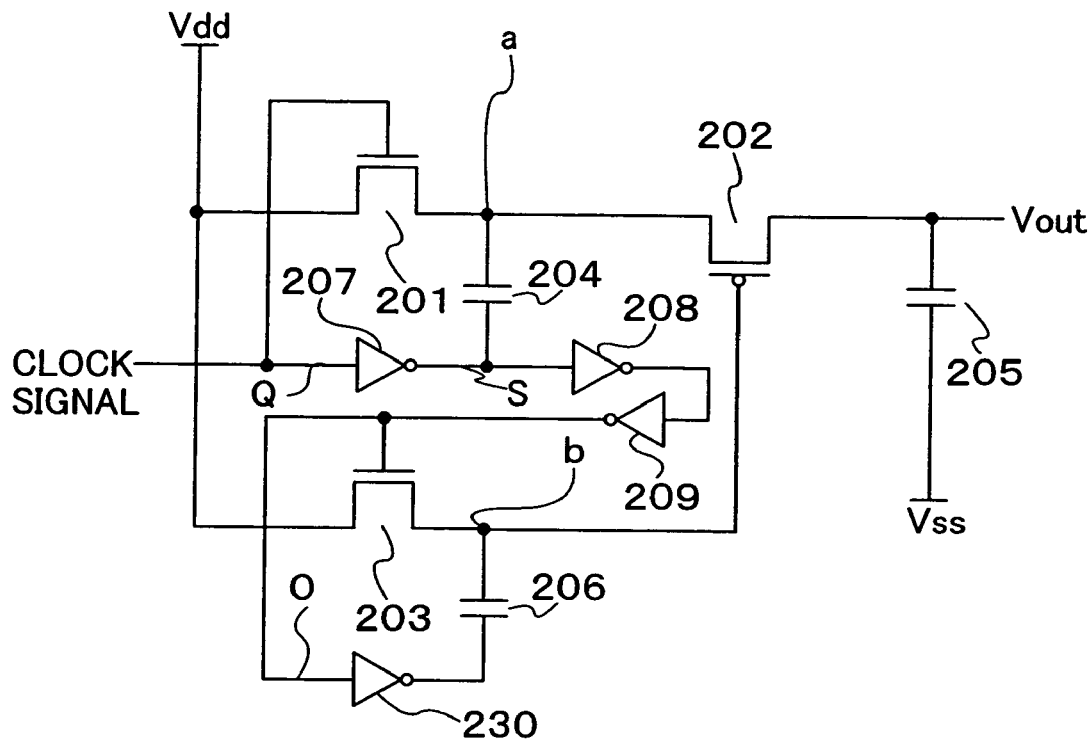
FIGS. 3A and 3B are diagrams showing structural examples of charge pump circuits of the present invention.

FIG. 3A shows the structure of a charge pump circuit of this embodiment mode of the present invention.

The charge pump shown in FIG. 3A includes a first transistor 201, a second transistor 202, a third transistor 203, a first capacitor 204, a second capacitor 205, a third capacitor 206, a first inverter 207, a second inverter 208, a third inverter 209, and a fourth inverter 230, and the first transistor 201 and the third transistor 203 are set to have n-channel type conductivity and the second transistor 202 is set to have p-channel type conductivity. Further, a feature is that the first transistor 201 and the third transistor 203 are normally on.

Next, the connection relation of each element is explained.

First electrodes of the first transistor 201 and the third transistor 203 are connected to Vdd at a high-level potential. An input side (point Q) of the first inverter 207 is connected to a gate electrode of the first transistor 201; an output side (point S) of the first inverter 207 is connected through the first capacitor 204 to a second electrode of the first transistor 201 and a first electrode of the second transistor 202; and an output side of the second inverter 208 is connected through the third inverter 209 to an input side of the fourth inverter 230 and a gate electrode of the third transistor 203. An output side of the fourth inverter 230 is connected through the third capacitor 206 to a second electrode of the third transistor 203 and a gate electrode of the second transistor 202. In addition, a second electrode of the second transistor 202 is connected to Vss at a low-level potential through the second capacitor 205.

The above-described connection point of the second electrode of the first transistor 201 is indicated by "a" in the drawing and is hereinafter referred to as a "node a", and the connection point of the second electrode of the third transistor 203 is indicated by "b" in the drawing and is hereinafter referred to as a "node b".

The operation of a charge pump having such a circuit structure is explained. Note that, for simple explanation, a high-level potential (High potential) is set to 5 V and a low-level potential (Low potential) is set to 0 V; however, this embodiment mode is not limited thereto. A clock signal, of which High potential is 5 V and Low potential is 0 V, is inputted to the input side (point Q) of the first inverter 207. It is needless to say that the values are practically not limited thereto. For example, when High potential (5 V) is inputted to the input side (point Q) of the first inverter 207, 0 V is inputted to the first capacitor 204. At this time, the first transistor 201 is turned on and the potential of the node a is 5 V. Simultaneously, 0 V is inputted to the gate electrode of the third transistor 203 through the second inverter 208 and the third inverter 209, so that the third transistor 203 is turned off. In addition, 5 V is inputted to the third capacitor 206 from the fourth inverter 230, so that the potential of the node b is 5 V and the second transistor 202 is turned off. Therefore, a predetermined charge is accumulated in the first capacitor 204 without leakage.

When Low potential (0 V) is subsequently inputted to the input side (point Q) of the first inverter 207, High potential (5 V) is inputted to the first capacitor; the first transistor 201, to the gate electrode of which Low potential (0 V) is inputted, is turned off; and the potential of the node a which is twice as much as Vdd (5 V) can be surely obtained without leakage due to the charge accumulated in the first capacitor 204. Simultaneously, High potential (5V) is inputted to the gate electrode of the third transistor 203 and the input side (point O) of the fourth inverter 230 through the second inverter 208 and the third inverter 209, so that the third transistor 203 is turned on, and Low potential (0 V) is inputted to the third capacitor 206 through the fourth inverter 230, whereby the node b is 5 V and the second transistor 202 is certainly turned on. Accordingly, a voltage which is twice as much as Vdd (5 V) can be certainly outputted as Vout due to the charge accumulated in the first capacitor 204 by the second capacitor 205 and the second transistor 202.

Then, in a similar manner to Embodiment Mode 1, as for the potential of Vout, a voltage corresponding to (2×Vdd) can be outputted (see FIG. 1C).

This embodiment mode is not limited to the connection relation shown in FIG. 3A. For example, although the point S and the point Q are connected to each other through the inverter 207 and the point O and the point S are connected to each other through the inverter 208 and the inverter 209, this embodiment mode is not limited thereto.

Instead of the inverter 207, the inverter 208, and the inverter 209, potentials may be applied to the point Q, the point S, and the point O separately. In that case, a potential inputted to the point Q and the point S and a potential applied to the point Q and the point O are preferably inverted to each other. Note that the potential applied to the point Q and the point S and the potential applied to the point Q and the point O are not necessarily inverted to each other as long as normal operation is conducted.

As described above, in the charge pump circuit of this embodiment mode, only two values, Vdd of the power supply voltage and Vdd×2, are transmitted to the node a, and in accordance with whether the second transistor is on or off, the voltage of Vdd×2 can be surely outputted as an output voltage Vout.

Hereinabove, this embodiment mode explains the case where the first and third transistors have n-channel type conductivity and are normally on and the second transistor has p-channel type conductivity; however, the conductivity of the transistors is not limited thereto. For example, a circuit structure may be that in which the first and third transistors are set to have p-channel type conductivity and be normally on by adjusting channel doping amount, the first electrode of the first transistor is held at a low-level potential, and the second transistor is set to have n-channel type conductivity. In other words, in this embodiment mode, the output voltage of the charge pump circuit can be stepped down by changing the conductivity of each transistor from an n-channel type to a p-channel type or a p-channel type to an n-channel type, and setting the potential of the first electrode of the first transistor from a high potential or a low potential.

In the above-described charge pump circuit, a thin film transistor can be used as the transistor. Accordingly, the charge pump circuit can be formed over the same substrate as a display device, or a nonvolatile memory such as a flash memory. However, when using a thin film transistor in a charge pump, it is difficult to step up a voltage to a predetermined potential because a thin film transistor has high threshold voltage. In addition, since threshold voltages vary among thin film transistors, potentials to be outputted may vary. Thus, since the output is determined by whether the second transistor is on or off as described above when using the charge pump of this embodiment mode, voltage drop by threshold voltage can be prevented. As a result, the charge pump of this embodiment mode provides a significant effect when using a thin film transistor with a higher threshold voltage than that of a transistor formed of a silicon wafer.

In addition, the charge pump formed using a thin film transistor can be formed over the same substrate as a semiconductor device such as a liquid crystal display device or a light emitting device. In that case, any or all of the first capacitor, the second capacitor, and the third capacitor may be formed over the same substrate as the semiconductor device. The number of parts can be reduced when the charge pump is formed over the same substrate as the semiconductor device. On the other hand, when not formed over the same substrate as the semiconductor device, a capacitor with a large capacitance can be located. Since the second capacitor needs to have a larger capacitance than the first capacitor and the third capacitor, the first capacitor and the third capacitor which may have a small capacitance can be formed over the same substrate as the semiconductor device to reduce the number of parts and to realize cost reduction. A capacitor with a large capacitance can be located as the second capacitor with a large capacitance by not being formed over the same substrate as the semiconductor device.

EMBODIMENT MODE 4

Figure 3B:
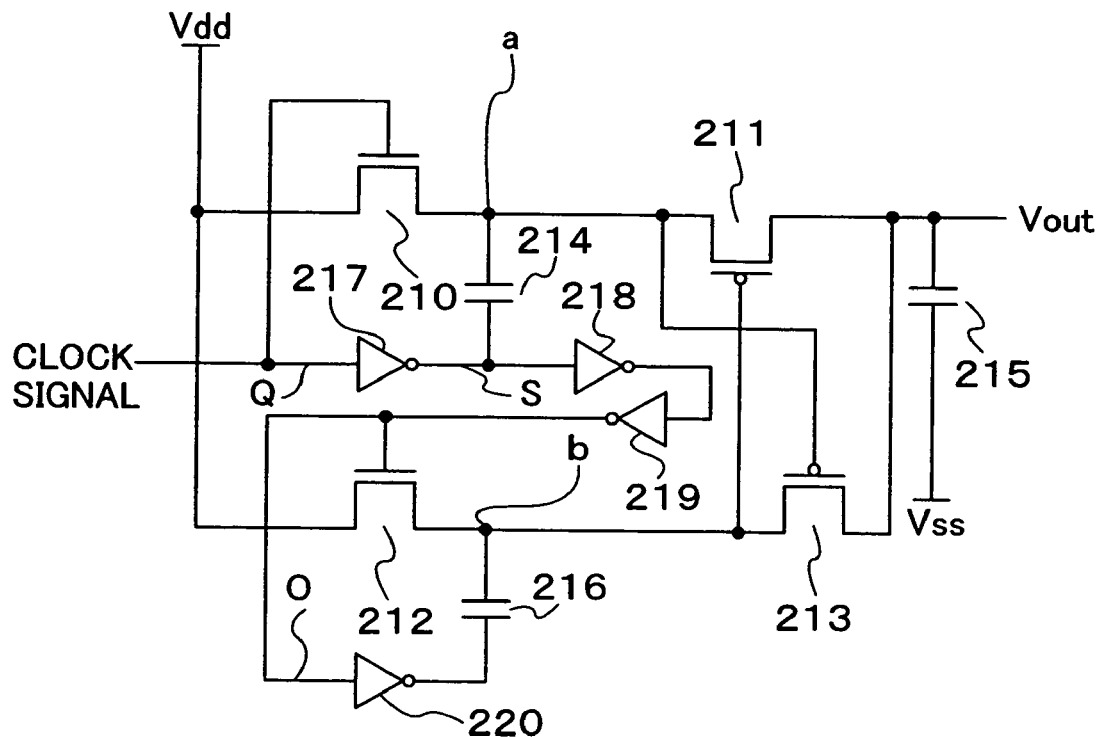

FIG. 3B shows an example of the structure of another charge pump circuit. The charge pump shown in FIG. 3B includes a first transistor 210, a second transistor 211, a third transistor 212, a first capacitor 214, a second capacitor 215, a third capacitor 216, a first inverter 217, a second inverter 218, a third inverter 219, and a fourth inverter 220 similar to FIG. 3A, and further includes a fourth transistor 213, which is different from FIG. 3A. The fourth transistor 213 is set to have p-type conductivity. The conductivity of the other transistors is similar to FIG. 3A.

Next, the connection relation of each element is explained. Unlike in FIG. 3A, in the charge pump shown in FIG. 3B, a gate electrode and a first electrode of the fourth transistor 213 are connected to the node a and the node b, respectively, and a second electrode thereof is connected to Vout. The other connection relation is similar to FIG. 3A.

The operation of a charge pump circuit having such a circuit structure is similar to the operation explained with reference to FIG. 3A.

In addition, in a similar manner to Embodiment Mode 1, as for the potential of Vout, a voltage corresponding to (2×Vdd) can be outputted (see FIG. 1C).

In this embodiment mode, the node of Vout is constantly driven by the fourth transistor; therefore, a stable output voltage with few ripples can be supplied.

As described above, in the charge pump circuit of this embodiment mode, only two values, Vdd of the power supply voltage and Vdd×2, are transmitted to the node a, and in accordance with whether the second transistor is on or off, the voltage of Vdd×2 can be surely outputted as Vout of the output voltage.

The connection relation of this embodiment mode is not limited to that shown in FIG. 3B, which is as described in Embodiment Mode 3.

Hereinabove, this embodiment mode explains the case where the first and third transistors have n-channel type conductivity and are normally on and the second transistor has p-channel type conductivity; however, the conductivity of the transistors is not limited thereto. For example, a circuit structure may be that in which the first and third transistors are set to have p-channel type conductivity and be normally on by adjusting channel doping amount, the first electrode of the first transistor is held at a low-level potential, and the second transistor has n-channel type conductivity. In that case, the circuit structure may be that in which the fourth transistor has the conductivity opposite to that shown in the drawing. In other words, in this embodiment mode, the output voltage of the charge pump circuit can be stepped down by changing the conductivity of each transistor from an n-channel type to a p-channel type or a p-channel type to an n-channel type, and setting the potential of the first electrode of the first transistor from a high potential to a low potential.

In the above-described charge pump circuit, a thin film transistor can be formed as the transistor. Accordingly, the charge pump circuit can be formed over the same substrate as a display device, or a nonvolatile memory such as a flash memory. However, when using a thin film transistor in a charge pump, it is difficult to step up a voltage to a predetermined potential because a thin film transistor has high threshold voltage. In addition, since threshold voltages vary among thin film transistors, potentials to be outputted may vary. Thus, since the output is determined by whether the second transistor is on or off as described above when using the charge pump of this embodiment mode, voltage drop by threshold voltage can be prevented. As a result, the charge pump of this embodiment mode provides a significant effect when using a thin film transistor with a higher threshold voltage than that of a transistor formed of a silicon wafer.

In addition, the charge pump formed using a thin film transistor can be formed over the same substrate as a semiconductor device such as a liquid crystal display device or a light emitting device. In that case, any or all of the first capacitor, the second capacitor, and the third capacitor may be formed over the same substrate as the semiconductor device. The number of parts can be reduced when the charge pump is formed over the same substrate as the semiconductor device. On the other hand, when not formed over the same substrate as the semiconductor device, a capacitor with a large capacitance can be located. Since the second capacitor needs to have a larger capacitance than the first capacitor and the third capacitor, the first capacitor and the third capacitor which may have a small capacitance can be formed over the same substrate as the semiconductor device to reduce the number of parts and to realize cost reduction. A capacitor with a large capacitance can be located as the second capacitor with a large capacitance by not being formed over the same substrate as the semiconductor device.

EMBODIMENT MODE 5

Figure 4:
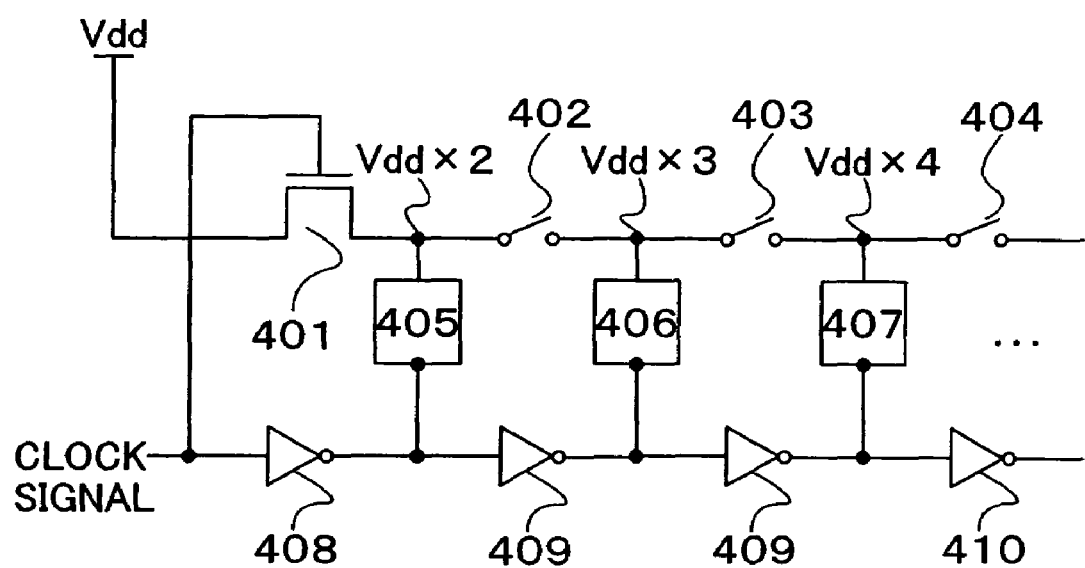
FIG. 4 is a diagram showing a structural example of a charge pump circuit of the present invention.

In this embodiment mode, by increasing the number of stages by forming a structure shown in FIG. 4 using a block indicated by a dotted line in a first stage of FIG. 1A, the potential can be adjusted to be Vdd×2 with one stage, Vdd×3 with two stages, and Vdd×4 with three stages. In other words, as for the output voltage of the above-described charge pump circuit, a desired potential can be outputted by adjusting the number of stages.

The charge pump circuit shown in FIG. 4 includes a transistor 401, a plurality of switches 402 to 404, a plurality of capacitors 405 to 407, and a plurality of inverters 408 to 410. One electrode of the transistor 401 is at a predetermined potential; an input side of the inverter 408 is connected to a gate electrode of the transistor 401; and an output side of the inverter 408 is connected to the other electrode of the first transistor 401 through the capacitor 405 and to one side of the switch 402. Note that the number of capacitors, switches, inverters, and the like is not limited to that shown in FIG. 4.

In addition, this embodiment mode can be used in combination with any of Embodiment Modes 1 to 4.

In the above-described charge pump circuit, a thin film transistor can be formed as the transistor. Accordingly, the charge pump circuit can be formed over the same substrate as a display device, or a nonvolatile memory such as a flash memory. However, when using a thin film transistor in a charge pump, it is difficult to step up a voltage to a predetermined potential because a thin film transistor has high threshold voltage. In addition, since threshold voltages vary among thin film transistors, potentials to be outputted may vary. Thus, since the output is determined by whether the second transistor is on or off as described above when using the charge pump of this embodiment mode, voltage drop by threshold voltage can be prevented. As a result, the charge pump of this embodiment mode provides a significant effect when using a thin film transistor with a higher threshold voltage than that of a transistor formed of a silicon wafer.

In addition, the charge pump formed using a thin film transistor can be formed over the same substrate as a semiconductor device such as a liquid crystal display device or a light emitting device. In that case, any or all of the capacitors may be formed over the same substrate as the semiconductor device. The number of parts can be reduced when the charge pump is formed over the same substrate as the semiconductor device. On the other hand, when not formed over the same substrate as the semiconductor device, a capacitor with a large capacitance can be located. Since the second capacitor needs to have a larger capacitance than the first capacitor, the first capacitor which may have a small capacitance can be formed over the same substrate as the semiconductor device to reduce the number of parts and to realize cost reduction. A capacitor with a large capacitance can be located as the second capacitor with a large capacitance by not being formed over the same substrate as the semiconductor device.

EMBODIMENT MODE 6

Figure 5A:
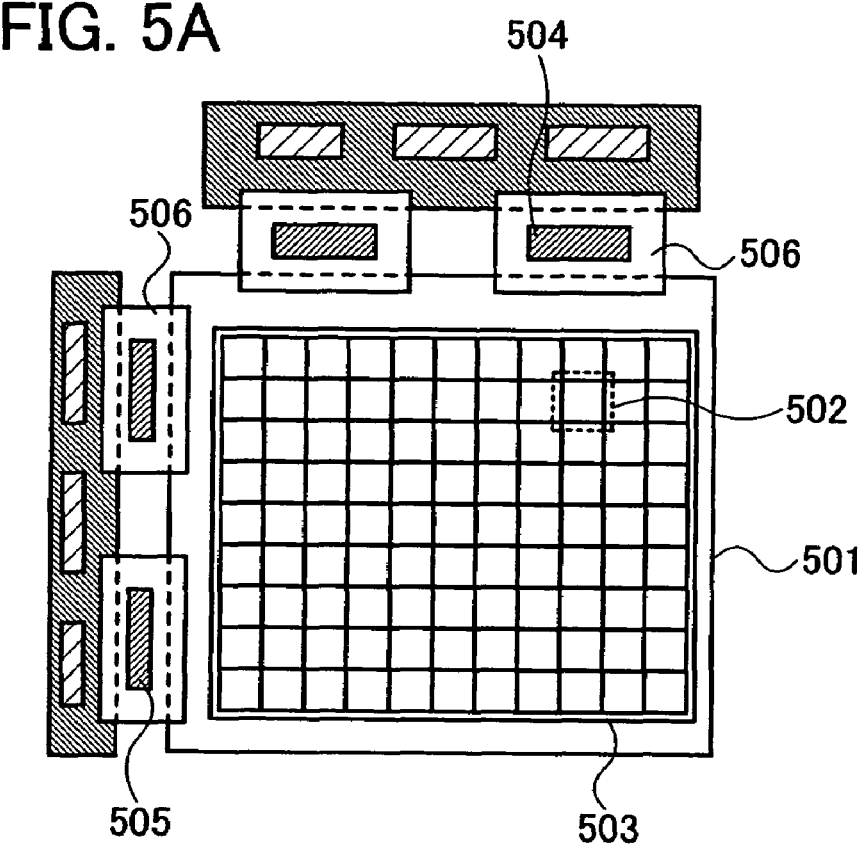
FIGS. 5A and 5B are diagrams showing structures of display devices according to Embodiment Mode 6.
Figure 5B:
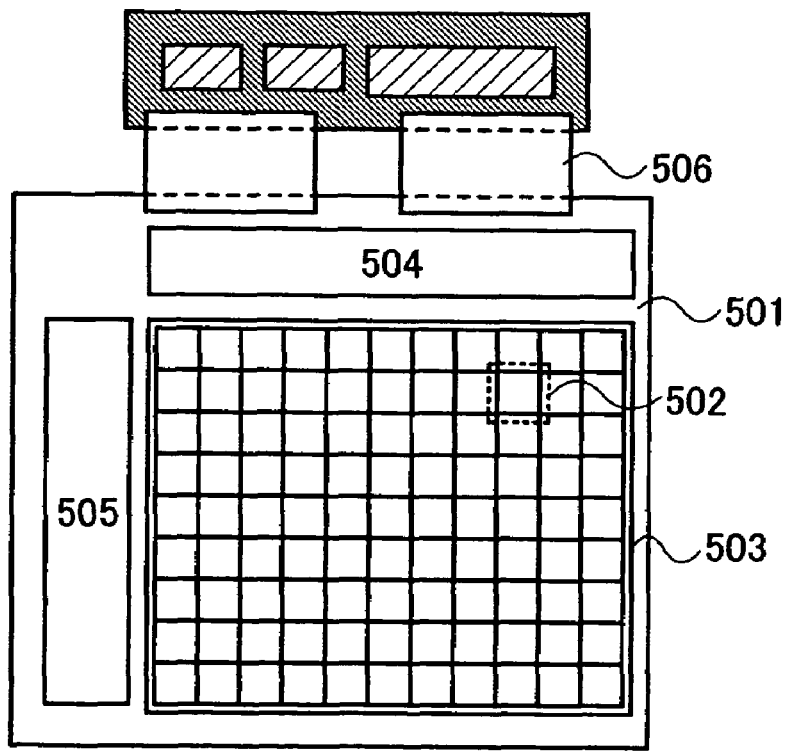

This embodiment mode explains a display device which includes the charge pump circuit described in any of Embodiment Modes 1 to 5 and of which display screen is formed by applying to a pixel a light emitting element that uses a material exhibiting electroluminescence, with reference to FIGS. 5A and 5B.

In FIG. 5A, a display panel 501 has a pixel portion 503 including a plurality of pixels 502 arranged in matrix. Each pixel 502 is provided with a switching element such as a transistor and a light emitting element connected to the switching element. An input terminal is provided in an end portion of the display panel 501. On a connection wiring 506, driver ICs including a signal line driver circuit 504 and a scan line driver circuit 505 may be mounted. The charge pump circuit described in any of Embodiment Modes 1 to 5 is incorporated in the driver IC.

In another mode, the signal line driver circuit 504 and the scan line driver circuit 505 can be provided over the same substrate as the pixel portion 503 as shown in FIG. 5B. These driver circuits can be formed using p-channel and n-channel transistors similar to the transistors included in the pixels 502. The charge pump circuit described in any of Embodiment Modes 1 to 5 is formed using a transistor. In this case, a channel formation region of the transistor is preferably formed using a polycrystalline semiconductor.

Such a display device does not require the voltage of an external circuit to be stepped up and can achieve reductions in power consumption and circuit area and an improvement in yield because the charge pump circuit is structured so as to reduce power consumption and conduct certain operation without being affected by variation in threshold voltage among transistors.

EMBODIMENT MODE 7

Figure 6A:
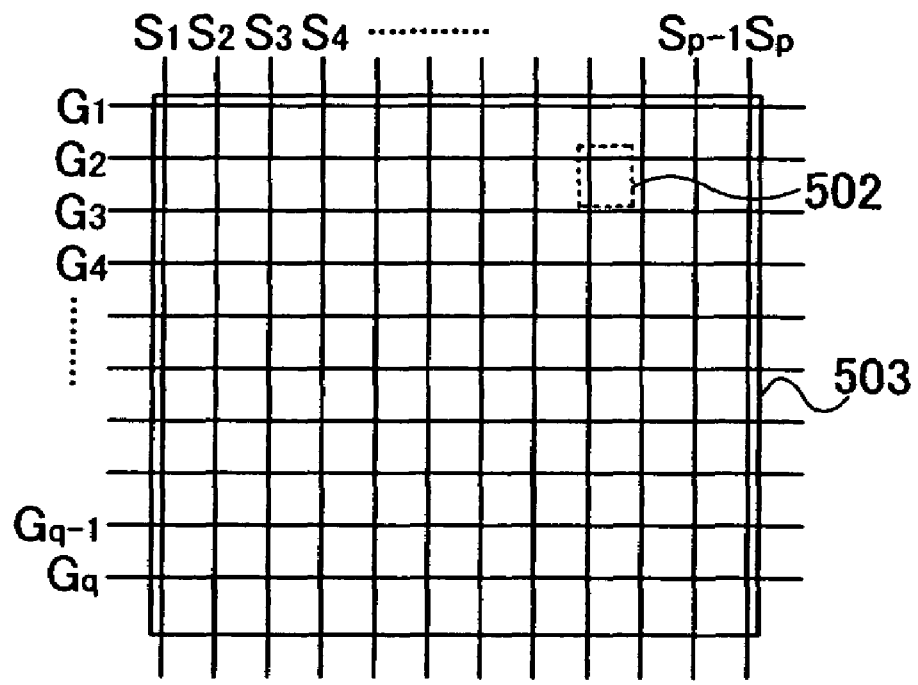
FIGS. 6A and 6B are diagrams showing structural examples of a pixel portion in the display device of FIGS. 5A and 5B.

FIG. 6A shows an example of the structure of the pixel portion 503 (hereinafter referred to as a first pixel structure) shown in FIGS. 5A and 5B. The pixel portion 503 includes a plurality of signal lines $S_1$ to $S_p$ (p is a natural number), a plurality of scan lines $G_1$ to $G_q$ (q is a natural number) which is provided to intersect with the plurality of signal lines $S_1$ to $S_p$, and the pixels 502 provided at every intersection of the signal lines $S_1$ to $S_p$ and the scan lines $G_1$ to $G_q$. In this case, the pixel 502 refers to a region including a compartmented region surrounded by the signal lines and the scan lines.

Figure 6B:
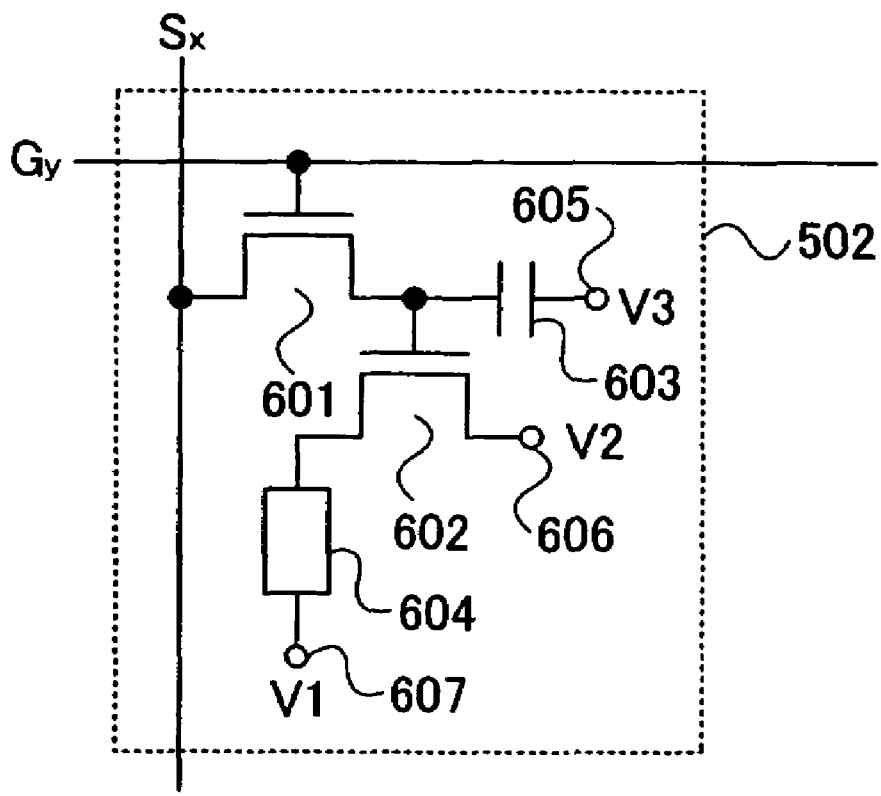

FIG. 6B shows the structure of the pixel 502 of FIG. 6A. FIG. 6B shows the pixel 502 which is formed at the intersection of a signal line $S_x$ (x is a natural number equal to or smaller than p) among the plurality of signal lines $S_1$ to $S_p$ and a scan line $G_y$ (y is a natural number equal to or smaller than q) among the plurality of scan lines $G_1$ to $G_q$. The pixel 502 includes a first TFT 601, a second TFT 602, a capacitor 603, and a light emitting element 604. Note that this embodiment mode gives an example of using the light emitting element 604, which includes a pair of electrodes and emits light by current flow between the pair of electrodes. As the capacitor 603, parasitic capacitance or the like of the second TFT 602 may be used positively. Each of the first TFT 601 and the second TFT 602 may be an n-channel TFT or a p-channel TFT.

A gate of the first TFT 601 is connected to the scan line $G_y$; one of a source and a drain of the first TFT 601 is connected to the signal line $S_x$; and the other is connected to a gate of the second TFT 602 and one electrode of the capacitor 603. The other electrode of the capacitor 603 is connected to a terminal 605 to which a potential $V_3$ is applied. One of a source and a drain of the second TFT 602 is connected to one electrode of the light emitting element 604, and the other is connected to a terminal 606 to which a potential $V_2$ is applied. The other electrode of the light emitting element 604 is connected to a terminal 607 to which a potential $V_1$ is applied.

The operation of the pixel 502 having such a structure can be explained as follows. One of the plurality of scan lines $G_1$ to $G_q$ is selected, and while the scan line is selected, a video signal is inputted to all of the plurality of signal lines $S_1$ to $S_p$. In this manner, a video signal is inputted to pixels of a row in the pixel portion 503. A video signal is inputted to all of the pixels 502 in the pixel portion 503 by sequentially selecting the plurality of scan lines $G_1$ to $G_q$ and performing similar operation.

Explained next is the operation of the pixel 502 to which a video signal is inputted from the signal line $S_x$ among the plurality of signal lines $S_1$ to $S_p$ while the scan line $G_y$ among the plurality of scan lines $G_1$ to $G_q$ is selected. When the scan line $G_y$ is selected, the first TFT 601 is put in an on state. The on state of the TFT means that a region between a source and a drain conducts electricity, and an off state of the TFT means that the region between the source and the drain does not conduct electricity. When the first TFT 601 is in the on state, a video signal inputted to the signal line $S_x$ is inputted to the gate of the second TFT 602 through the first TFT 601. Whether the second TFT 602 is put in the on state or the off state is selected in accordance with the video signal inputted. When the second TFT 602 is selected to be in the on state, a drain current of the second TFT 602 flows to the light emitting element 604, so that the light emitting element 604 emits light.

The potential $V_2$ and the potential $V_3$ are maintained so that the potential difference is always constant when the second TFT 602 is in the on state. The potential $V_2$ and the potential $V_3$ may be equal to each other. When the potential $V_2$ and the potential $V_3$ are equal to each other, the terminal 605 and the terminal 606 may be connected to the same wiring. The potential $V_1$ and the potential $V_2$ are set so as to have a predetermined potential difference when the light emitting element 604 is selected to emit light. In this manner, current is caused to flow to the light emitting element 604, so that the light emitting element 604 emits light.

The display device including the pixel portion 503 has a significant effect because it includes the charge pump circuit described in any of Embodiment Modes 1 to 5, similar to Embodiment Mode 6. In other words, such a display device does not require the voltage of an external circuit to be stepped up and can achieve reductions in power consumption and circuit area and an improvement in yield because the charge pump circuit is structured so as to reduce power consumption and conduct certain operation without being affected by variation in threshold voltage among transistors.

EMBODIMENT MODE 8

Figure 7A:
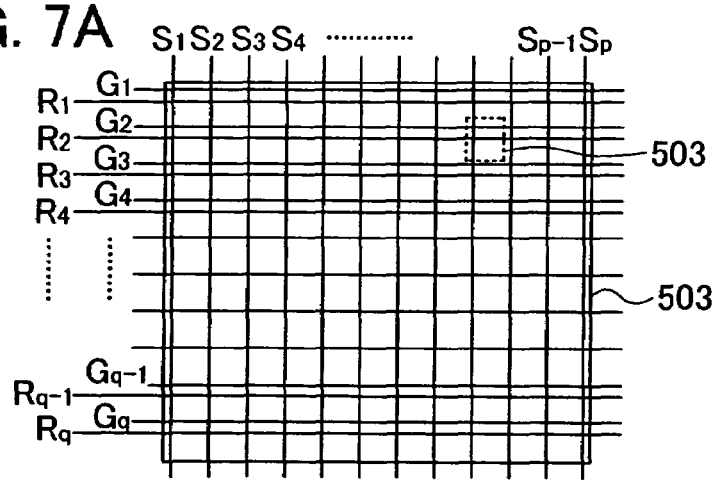
FIGS. 7A to 7C are diagrams showing structural examples of a pixel portion in the display device of FIGS. 5A and 5B.

FIG. 7A shows another example of the structure of the pixel portion 503 shown in FIGS. 5A and 5B. The pixel portion 503 includes the plurality of signal lines $S_1$ to $S_p$ (p is a natural number), the plurality of scan lines $G_1$ to $G_q$ (q is a natural number) and a plurality of scan lines $R_1$ to $R_q$ which are provided to intersect with the plurality of signal lines $S_1$ to $S_p$, and the pixels 502 provided at every intersection of the signal lines $S_1$ to $S_p$ and the scan lines $G_1$ to $G_q$.

Figure 7B:
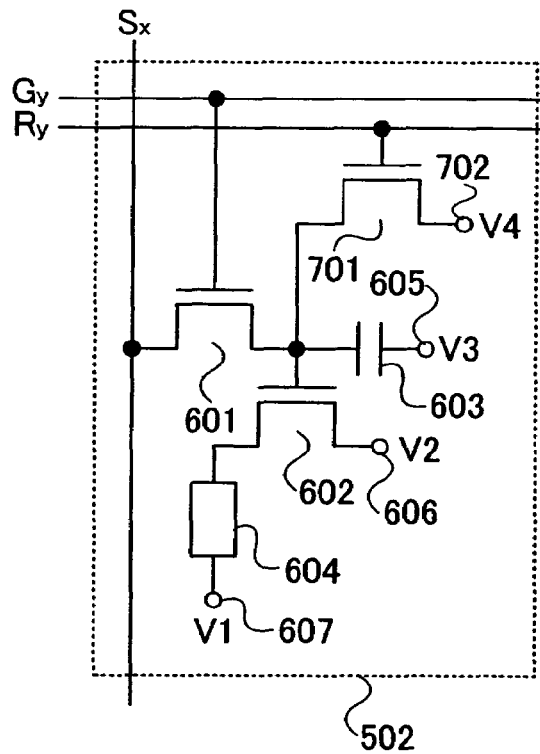

FIG. 7B shows the structure of the pixel 502 in FIG. 7A. FIG. 7B shows the pixel 502 formed at the intersection of one signal line $S_x$ (x is a natural number equal to or smaller than p) among the plurality of signal lines $S_1$ to $S_p$, and one scan line $G_y$ (y is a natural number equal to or smaller than q) among the plurality of scan lines $G_1$ to $G_q$ and one scan line $R_y$ among the plurality of scan lines $R_1$ to $R_q$. Note that in the pixel having the structure shown in FIG. 7B, the same reference numeral is used to denote the same portion as FIG. 6B, and the explanation thereof is omitted. The pixel shown in FIG. 7B is different from the pixel 502 shown in FIG. 6B in including a third transistor 701. The third transistor 701 may be either an n-channel transistor or a p-channel transistor.

A gate of the third transistor 701 is connected to the scan line $R_y$; one of a source and a drain of the third transistor 701 is connected to the gate of the second transistor 602 and the one electrode of the capacitor 603; and the other is connected to a terminal 702 to which a potential $V_4$ is applied.

One feature of the pixel having the structures shown in FIGS. 7A and 7B is that the light emitting element 604 of the pixel 502 can be put in a non-light emitting state regardless of a video signal inputted from the signal line $S_x$, because it includes the scan line $R_y$ and the third transistor 701. A period during which the light emitting element 604 of the pixel 502 emits light can be set by a signal inputted to the scan line $R_y$. Thus, a light emitting period which is shorter than a period for selecting all of the scan lines $G_1$ to $G_q$ by sequentially selecting the scan lines $G_1$ to $G_q$ can be set. In this manner, since a short subframe period can be set when performing display by a time division gray scale method, high-level gray scale expression can be conducted.

The potential $V_4$ may be set so that the second transistor 602 is in the off state when the third transistor 701 is in the on state. For example, the potential $V_4$ can be set to be equal to the potential $V_3$ when the third transistor 701 is put in the on state. By setting the potential $V_3$ and the potential $V_4$ to be equal to each other, a charge held by the capacitor 603 is discharged and a voltage between a source and a gate of the second transistor 602 is set to zero, so that the second transistor 602 can be put in the off state. Note that when the potential $V_3$ and the potential $V_4$ are set to be equal to each other, the terminal 605 and the terminal 702 may be connected to the same wiring.

Note that the arrangement of the third transistor 701 is not limited to that shown in FIG. 7B. For example, the third transistor 701 may be arranged in series with the second transistor 602. In this structure, a current flowing to the light emitting element 604 can be blocked and the light emitting element 604 can be put in a non-light emitting state by putting the third transistor 701 in the off state with a signal inputted to the scan line $R_y$.

Figure 7C:
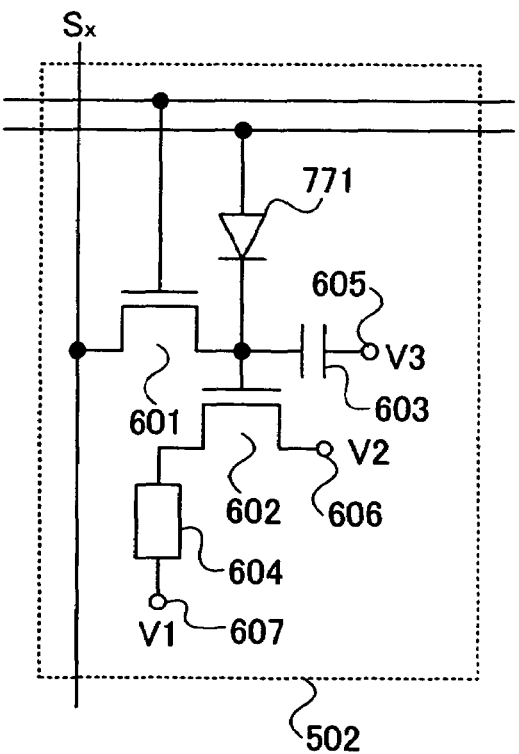

In place of the third transistor 701 shown in FIG. 7B, a diode can also be used. FIG. 7C shows the structure of a pixel using a diode in place of the third transistor 701. Note that the same reference numeral is used in FIG. 7C to denote the same portion as that in FIG. 7B, and the explanation thereof is omitted. One electrode of a diode 771 is connected to the scan line $R_y$, and the other is connected to the gate of the second transistor 602 and the one electrode of the capacitor 603.

The diode 771 causes a current to flow from one electrode to the other. The second transistor 602 is a p-channel transistor. By increasing the potential of one electrode of the diode 771, the potential of the gate of the second transistor 602 can be increased and the second transistor 602 can be put in the off state.

Although FIG. 7C shows the structure in which the diode 771 causes a current to flow from the one electrode connected to the scan line $R_y$ to the other electrode connected to the gate of the second transistor 602 and the second transistor 602 is a p-channel transistor, the structure of the pixel is not limited thereto. The structure may be that in which the diode 771 causes a current to flow from the other electrode connected to the gate of the second transistor 602 to the one electrode connected to the scan line $R_y$ and the second transistor 602 is an n-channel transistor. When the second transistor 602 is an n-channel transistor, the potential of the gate of the second transistor 602 is dropped and the second transistor 602 can be put in the off state by dropping the potential of the one electrode of the diode 771.

As the diode 771, a diode-connected transistor may be used. The diode-connected transistor refers to a transistor in which a drain and a gate are connected to each other. As the diode-connected transistor, either a p-channel transistor or an n-channel transistor may be used.

The display device including the pixel portion 503 has a significant effect because it includes the charge pump circuit described in any of Embodiment Modes 1 to 5, similar to Embodiment Mode 6. In other words, such a display device does not require the voltage of an external circuit to be stepped up and can achieve reductions in power consumption and circuit area and an improvement in yield because the charge pump circuit is structured so as to reduce power consumption and conduct certain operation without being affected by variation in threshold voltage among transistors.

EMBODIMENT MODE 9

Figure 8:
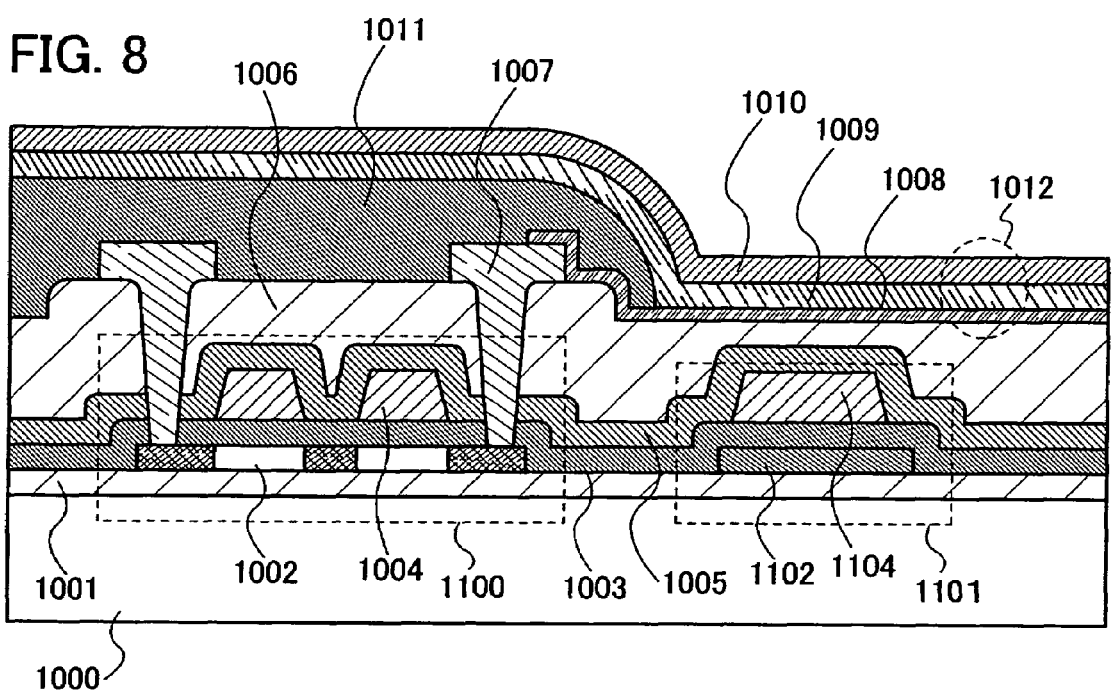
FIG. 8 is a diagram showing one structural example of a pixel in the display device of FIGS. 5A and 5B.

One mode of the structure of the pixel in the display device described in any of Embodiment Modes 6 to 8 is explained with reference to FIG. 8. FIG. 8 is a cross-sectional view of a pixel including a transistor and a light emitting element connected to the transistor.

In FIG. 8, a base layer 1001, a semiconductor layer 1002 which is a part of a transistor 1100, and a semiconductor layer 1102 which forms one electrode of a capacitor portion 1101 are formed over a substrate 1000. A first insulating layer 1003 is formed thereover, which functions as a gate insulating layer in the transistor 1100 and a dielectric layer for forming a capacitor in the capacitor portion 1101.

A gate electrode 1004 and a conductive layer 1104 which forms the other electrode of the capacitor portion 1101 are formed over the first insulating layer 1003. A wiring 1007 connected to the transistor 1100 is connected to a first electrode 1008 of a light emitting element 1012. This first electrode 1008 is formed over a third insulating layer 1006. A second insulating layer 1005 may be formed between the first insulating layer 1003 and the third insulating layer 1006. The light emitting element 1012 includes the first electrode 1008, an EL layer 1009, and a second electrode 1010. In addition, a fourth insulating layer 1011 is formed so as to cover a peripheral end portion of the first electrode 1008 and a connection portion of the first electrode 1008 and the wiring 1007.

Next, the details of the above-described structure are explained. The substrate 1000 may be a glass substrate of, for example, barium borosilicate glass, aluminoborosilicate glass, or the like, a quartz substrate, a ceramic substrate, or the like. A metal substrate including stainless steel or a semiconductor substrate having an insulating film on its surface may also be used. Alternatively, a substrate made from a synthetic resin having flexibility, such as plastics, may be used. A surface of the substrate 1000 may be planarized by polishing such as a chemical mechanical polishing (CMP) method.

As the base layer 1001, an insulating film of silicon oxide, silicon nitride, silicon nitride oxide, or the like can be used. The base layer 1001 can prevent alkali metal such as Na or alkaline earth metal contained in the substrate 1000 from diffusing into the semiconductor layer 1002 and adversely affecting the characteristics of the transistor 1100. Although the base layer 1001 has a single-layer structure in FIG. 8, it may be formed by stacking two or more layers. Note that when the impurity diffusion does not become a significant problem, for example, when a quartz substrate or the like is used, the base layer 1001 is not necessarily provided.

The surface of the glass substrate may be directly treated in high-density plasma with an electron temperature of 2 eV or less, an ion energy of 5 eV or less, and an electron density of approximately $10^{11}/cm^3$ to $10^{13}/cm^3$, which is excited by microwaves. The plasma can be generated by a plasma treatment apparatus of microwave excitation, using a radial slot antenna. At this time, when nitrogen ($N_2$) or nitride gas such as ammonia ($NH_3$) or nitrous oxide ($N_2O$) is introduced, the surface of the glass substrate can be nitrided. Since this nitrided layer formed on the surface of the glass substrate contains silicon nitride as its main component, the nitrided layer can be used as a blocking layer against the impurities diffused from a glass substrate side. The base layer 1001 may be provided by forming a silicon oxide film or a silicon oxynitride film over this nitrided layer by a plasma CVD method.

In addition, by conducting similar plasma treatment to the surface of the base layer 1001 made of silicon oxide, silicon oxynitride, or the like, nitriding treatment can be conducted to the surface in depth of 1 nm to 10 nm from the surface. With this extremely thin silicon nitride layer, it is possible to form a blocking layer without giving an effect of stress to the semiconductor layer to be formed over the silicon nitride layer.

As the semiconductor layer 1002 and the semiconductor layer 1102, a patterned crystalline semiconductor film is preferably used. The crystalline semiconductor film can be obtained by crystallizing an amorphous semiconductor film. As a crystallization method, a laser crystallization method, a thermal crystallization method using RTA or an annealing furnace, a thermal crystallization method using a metal element for promoting crystallization, or the like can be used. The semiconductor layer 1002 includes a channel formation region and a pair of impurity regions to which an impurity element imparting one conductivity type is added. An impurity region to which the impurity element is added at low concentration may be provided between the channel formation region and the pair of impurity regions. The semiconductor layer 1102 can have a structure in which an impurity element imparting one conductivity type or an impurity element imparting a conductivity type which is opposite of the former conductivity type is added entirely.

The first insulating layer 1003 can be formed with a single film or formed by stacking a plurality of films, using silicon oxide, silicon nitride, silicon nitride oxide, or the like. In this case, the surface of the insulating film may be oxidized or nitrided so as to be more dense, by high-density plasma treatment excited by microwaves with an electron temperature of 2 eV or less, an ion energy of 5 eV or less, and an electron density of approximately $10^{11}/cm^3$ to $10^{13}/cm^3$. This treatment may be conducted before the formation of the first insulating layer 1003. That is to say, the plasma treatment may be conducted to the surface of the semiconductor layer 1002. At this time, a favorable interface with a gate insulating layer to be deposited thereover can be formed by conducting the treatment in oxidizing atmosphere ($O_2$, $N_2O$, or the like) or nitriding atmosphere ($N_2$, $NH_3$, or the like) with a substrate temperature of 300° C. to 450° C.

The gate electrode 1004 and the conductive layer 1104 may have a single-layer structure or a stacked-layer structure including one element or a plurality of elements selected from Ta, W, Ti, Mo, Al, Cu, Cr, and Nd, or an alloy or a compound including plural elements selected from the above elements.

The transistor 1100 includes the semiconductor layer 1002, the gate electrode 1004, and the first insulating layer 1003 between the semiconductor layer 1002 and the gate electrode 1004. In FIG. 8, a transistor connected to the first electrode 1008 of the light emitting element 1012 is shown as the transistor 1100 included in the pixel. This transistor 1100 has a multigate structure in which a plurality of gate electrodes 1004 is disposed over the semiconductor layer 1002. In other words, a plurality of transistors is connected serially. This structure makes it possible to suppress an unnecessary increase in off current. Moreover, the transistor 1100 is a top-gate transistor in FIG. 8; however, a bottom-gate transistor having a gate electrode below a semiconductor layer can also be employed. Further, a dual-gate transistor having gate electrodes above and below the semiconductor layer is also applicable.

The capacitor portion 1101 has the first insulating layer 1003 as a dielectric, and has the semiconductor layer 1102 and the conductive layer 1104, which oppose to each other with the first insulating layer 1003 interposed therebetween, as a pair of electrodes. In the capacitor portion provided in the pixel, one of the pair of electrodes is the semiconductor layer 1102 formed at the same time as the semiconductor layer 1002 of the transistor 1100 while the other is the conductive layer 1104 formed at the same time as the gate electrode 1004 in FIG. 8. However, the present invention is not limited to this structure.

The second insulating layer 1005 is preferably an insulating film having a barrier property for blocking ionic impurities, such as a silicon nitride film. This second insulating layer 1005 is formed of silicon nitride or silicon oxynitride. This second insulating layer 1005 also serves as a protective film for preventing contamination of the semiconductor layer 1002. After depositing the second insulating layer 1005, high-density plasma treatment excited by microwaves may be conducted as mentioned above by introducing a hydrogen gas, so that the second insulating layer 1005 is hydrogenated. Alternatively, an ammonia gas may be introduced to nitride and hydrogenate the second insulating layer 1005. Further, oxygen, a $N_2O$ gas, or the like may be introduced together with a hydrogen gas to conduct oxynitriding treatment and hydrogenating treatment. By conducting nitriding treatment, oxidizing treatment, or oxynitriding treatment according to this method, a surface of the second insulating layer 1005 can be made more dense. Accordingly, the function as a protective film can be strengthened. The hydrogen introduced into the second insulating layer 1005 can be released from silicon nitride forming the second insulating layer 1005 by conducting heat treatment at 400° C. to 450° C. thereafter, so that the semiconductor layer 1002 can be hydrogenated.

The third insulating layer 1006 can be formed using an inorganic insulating film or an organic insulating film. As the inorganic insulating film, a silicon oxide film formed by a CVD method, a SOG (Spin On Glass) film (a silicon oxide film formed by coating), or the like can be used. As the organic insulating film, a film formed of polyimide, polyamide, BCB (benzocyclobutene), acrylic, a positive photosensitive organic resin, a negative photosensitive organic resin, or the like can be used. Moreover, a material whose skeletal structure includes a bond of silicon (Si) and oxygen (O) can be used as the third insulating layer 1006. As the substituent of this material, an organic group including at least hydrogen (such as an alkyl group or aromatic hydrocarbon) is used. Further, a fluoro group may be used as the substituent. Furthermore, a fluoro group and an organic group including at least hydrogen may be used as the substituent.

As the wiring 1007, a single-layer or stacked-layer structure including one element selected from Al, Ni, C, W, Mo, Ti, Pt, Cu, Ta, Au, and Mn or an alloy including plural elements selected from the above elements can be used.

One or both of the first electrode 1008 and the second electrode 1010 can be a transparent electrode/transparent electrodes. As the transparent electrode, indium oxide containing tungsten oxide (IWO), indium zinc oxide containing tungsten oxide (IWZO), indium oxide containing titanium oxide (ITiO), indium tin oxide containing titanium oxide (ITTiO), indium tin oxide containing molybdenum (ITMO), or the like can be used. It is needless to say that it is possible to use indium tin oxide (ITO), indium zinc oxide (IZO), indium tin oxide to which silicon oxide is added (ITSO), or the like.

At least one of the first electrode 1008 and the second electrode 1010 may be formed using a material which does not have a light-transmitting property. For example, alkali metal such as Li or Cs; alkaline earth metal such as Mg, Ca, or Sr; an alloy including any one of these (such as Mg:Ag, Al:Li, or Mg:In); or a compound of these elements ($CaF_2$, calcium nitride) can be used. In addition to these, rare earth metal such as Yb or Er can be used.

The fourth insulating layer 1011 can be formed using a similar material to that of the third insulating layer 1006.

The light emitting element 1012 includes the EL layer 1009, and the first electrode 1008 and the second electrode 1010 sandwiching the EL layer 1009. One of the first electrode 1008 and the second electrode 1010 corresponds to an anode while the other corresponds to a cathode. When a voltage higher than a threshold voltage is applied between the anode and the cathode with forward bias, current flows from the anode to the cathode, whereby the light-emitting element 1012 emits light.

The EL layer 1009 has a single-layer or multilayer structure. In the case of the multilayer structure, layers forming the EL layer 1009 can be categorized into a hole injection layer, a hole transport layer, a light emitting layer, an electron transport layer, an electron injection layer, and the like according to the carrier transport property. The boundary between these layers is not always necessary to be clear and, in some cases, the materials of the layers are partially mixed and the boundary is unclear. The layers can be formed using an organic material or an inorganic material. As the organic material, any one of a high molecular material, an intermediate molecular material, and a low molecular material can be used.

The EL layer 1009 is preferably formed using a plurality of layers with different functions, such as a hole injection/transport layer, a light emitting layer, and an electron injection/transport layer. The hole injection/transport layer is preferably formed using a complex material including an organic compound material having a hole transport property and an inorganic compound material showing an electron accepting property with respect to the organic compound material. By employing such a structure, a number of hole carriers are generated in the organic compound which originally has almost no intrinsic carriers, and an extremely superior hole injection/transport property can be obtained. This effect makes it possible to decrease the drive voltage as compared with before. Moreover, the hole injection/transport layer can be made thick without causing the drive voltage to increase. Thus, short-circuit of the light emitting element due to dust or the like can be suppressed.

As the organic compound material having a hole transport property, for example, the following can be used: copper phthalocyanine (abbr.: CuPc); 4,4',4"-tris[N-(3-methylphenyl)-N-phenylamino]triphenylamine (abbr.: MTDATA); 1,3,5-tris[N,N-di(m-tolyl)amino]benzene (abbr.: m-MTDAB), N,N'-diphenyl-N,N'-bis(3-methylphenyl)-1,1'-biphenyl-4,4'-diamine (abbr.: TPD), 4,4'-bis[N-(1-naphthyl)-N-phenylamino]biphenyl(abbr.: NPB), 4,4'-bis{N-[4-di(m-tolyl)amino]phenyl-N-phenylamino}biphenyl(abbr.: DNTPD), and the like. However, the organic compound material having a hole transport property is not limited to these.

As an example of the inorganic compound material having an electron accepting property, titanium oxide, zirconium oxide, vanadium oxide, molybdenum oxide, tungsten oxide, rhenium oxide, ruthenium oxide, zinc oxide, or the like is given. In particular, vanadium oxide, molybdenum oxide, tungsten oxide, and rhenium oxide are preferable because they can be formed by vacuum evaporation and easily treated.

The electron injection/transport layer is formed with an organic compound material having an electron transport property. Specifically, tris(8-quinolinolato)aluminum (abbr.: $Alq_3$), tris(4-methyl-8-quinolinolato)aluminum (abbr.: $Almq_3$), bis(2-methyl-8-quinolinolato)(4-phenylphenolato) aluminum (abbr.: BAlq), bathocuproin (abbr.: BCP), 2-(4- biphenylyl)-5-(4-tert-butylphenyl)-1,3,4-oxadiazole (abbr.: PBD), 3-(4-biphenylyl)-4-phenyl-5-(4-tert-butylphenyl)-1, 2,4-triazole (abbr.: TAZ), or the like is used; however, the organic compound material having an electron transport property is not limited to these.

The light emitting layer can be formed using the following material: 9,10-di(2-naphthyl)anthracene (abbr.: DNA), 9,10-di(2-naphthyl)-2-tert-butylanthracene (abbr.: t-BuDNA), 4,4'-bis(2,2-diphenylvinyl)biphenyl(abbr.: DPVBi), coumarin 30, coumarin 6, coumarin 545, coumarin 545T, rubrene, 2,5,8,11-tetra(tert-butyl)perylene (abbr.: TBP), 9,10-diphenylanthracene (abbr.: DPA), 5,12-diphenyltetracene, 4-(dicyanomethylene)-2-methyl-[p-(dimethylamino) styryl]-4H-pyran (abbr.: DCM1), 4-(dicyanomethylene)-2-methyl-6-[2-(julolidine-9-yl)ethenyl]-4H-pyran (abbr.: DCM2), or the like. Moreover, the following compound generating phosphorescence can be used: bis{2-[3',5'-bis(trifluoromethyl)phenyl]pyridinato-N,$C^{2'}$}iridium(picolinate) (abbr.: Ir(CF$_3$ppy)$_2$(pic)), tris(2-phenylpyridinato-N,$C^{2'}$)iridium (abbr.: Ir(ppy)$_3$), bis(2-phenylpyridinato-N,$C^{2'}$)iridium (acetylacetonate) (abbr.: Ir(ppy)$_2$(acac)), bis[2-(2'-thienyl) pyridinato-N,$C^{3'}$]iridium(acetylacetonate) (abbr.: Ir(thp)$_2$ (acac)), bis(2-phenylquinolinato-N,$C^{2'}$)iridium (acetylacetonate) (abbr.: Ir(pq)$_2$(acac)), or the like.

The light emitting layer may use a singlet excited light emitting material and a triplet excited light emitting material including a metal complex or the like. For example, among a red light emitting pixel, a green light emitting pixel, and a blue light emitting pixel, the red light emitting pixel whose luminance half-reduced period is relatively short is formed with a triplet excited light emitting material and the others are formed with a singlet excited light emitting material. Because of high luminous efficiency, a feature of the triplet excited light emitting material is to consume less power than a singlet excited light emitting material to obtain the same luminance. In other words, since if the red light emitting pixel is formed using a triplet excited light emitting material, the reliability thereof can be improved because the amount of current to be fed to the light emitting element is small. In order to decrease the power consumption, the red light emitting pixel and the green light emitting pixel may be formed using a triplet excited light emitting material and the blue light emitting pixel may be formed using a singlet excited light emitting material. By forming the green light emitting element, which has high visibility to human eyes, using a triplet excited light emitting material in this manner, a further reduction in power consumption can be achieved.

The light emitting layer may have a structure for performing display with colors by forming a light emitting layer with a different light emission wavelength band for each pixel. Typically, light emitting layers corresponding to the respective colors of R (red), G (green), and B (blue) are formed. Even in this case, when, on a light emission side of the pixel, a filter which transmits light with the light emission wavelength band is provided, color purity can be increased and reflection of the pixel portion can be prevented. By providing the filter, it is possible to omit a circularly polarizing plate and the like which is conventionally considered necessary and to avoid the loss of light emitted from the light emitting layer. Moreover, a change in color tone when the pixel portion (display screen) is viewed obliquely can be decreased.

The display device including the pixel with the structure shown in FIG. 8 can reduce power consumption because it includes the charge pump circuit described in any of Embodiment Modes 1 to 5. In other words, such a display device does not require the voltage of an external circuit to be stepped up and can achieve reductions in power consumption and circuit area and an improvement in yield because the charge pump circuit is structured so as to reduce power consumption and conduct certain operation without being affected by variation in threshold voltage among transistors.

EMBODIMENT MODE 10

Figure 9:
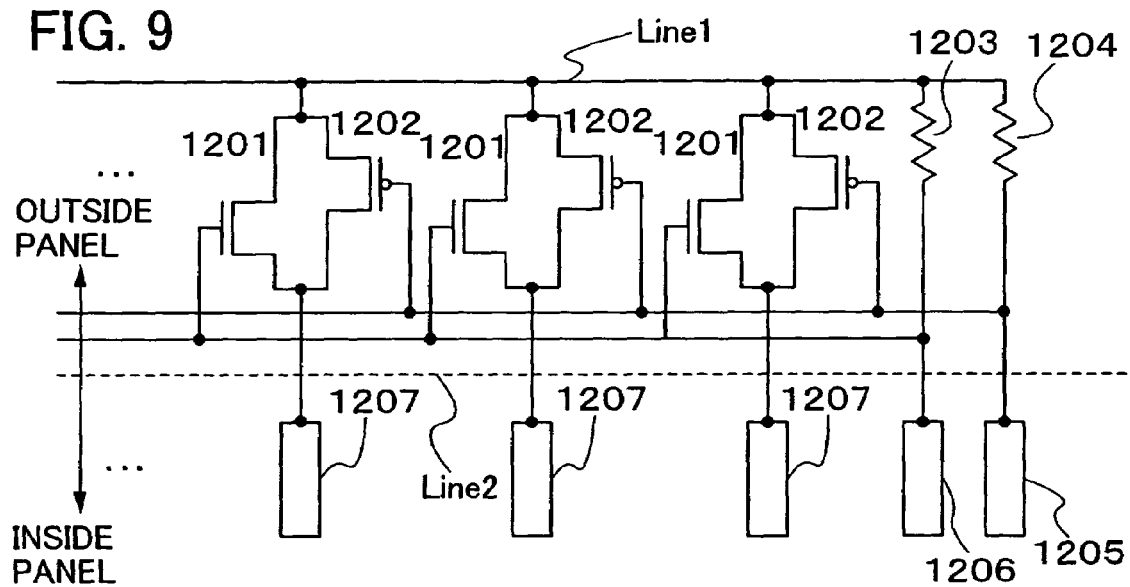
FIG. 9 is a diagram showing a structure of a regulator according to Embodiment Mode 9.

FIG. 9 shows the structure of a short ring of this embodiment mode of the present invention.

In FIG. 9, the same reference numeral is used to denote the same portion or a portion having a similar function, and the repetitive explanation thereof is omitted.

The short ring shown in FIG. 9 includes a first transistor 1201, a second transistor 1202, a first resistor 1203, a second resistor 1204, a first pad 1205, a second pad 1206, and a third pad 1207, and one electrode of the first transistor 1201 is connected to one electrode of the second transistor 1202, one side of the first resistor 1203, and one side of the second resistor 1204; the connection point is referred to as Line 1; and the other electrode of the first transistor 1201 is connected to the other electrode of the second transistor, the other side of the first resistor, the other side of the second resistor, the first pad, the second pad, and the third pad.

In this embodiment mode, the conductivity of the first transistor 1201 is an n-channel type, the conductivity of the second transistor 1202 is a p-channel type, and the first transistor is normally on.

In the manufacturing step of a thin film transistor and at the stage of panel assembly of a display device, high static electricity may be applied to one thin film transistor due to the influence of static electricity. In particular, since each thin film transistor has an extremely small size, electrostatic discharge damage and defects may be generated due to slight charging. The short ring functions to prevent the generation of them.

The operation of the short ring of FIG. 9 is explained.

Even if all the pads are in a floating state and all the pads are at the same potential at the stage of panel assembly, when the potential of any of the pads is increased, the second transistor 1202 is turned on to eliminate a potential difference among terminals. When the potential of any of the pads is decreased, the first transistor 1201 is turned on to eliminate a potential difference among terminals.

At the time of inspection, the first pad 1205 is set to High potential, and the second pad 1206 is set to Low potential. For example, by setting the second pad 1206 to −10 V and the first pad 1205 to 10 V when the first resistor 1203=the second resistor 1204, the potential of Line 1 becomes 0 V and resistance between each pad is increased. Therefore, inspection in a high-resistance state is possible.

Since the short ring becomes unnecessary after the completion of a display device, it is separated from wirings inside the panel along Line 2 shown in the drawing by laser light irradiation in the last step, and normal operation can be performed.

In the short ring of FIG. 9, connection destination of the third pad 1207 can be short-circuited with a wiring pattern forming a thin film transistor.

As described above, the short ring of this embodiment mode realizes low resistance among terminals at the stage of panel assembly and high resistance at the time of inspection.

EMBODIMENT MODE 11

This embodiment mode explains a circuit which stabilizes an output potential from a charge pump, that is, a stabilized power supply circuit (regulator).

First, in the simplest structure of a stabilizing circuit, a capacitor with a large capacitance is located in an output portion of a charge pump. This capacitor with a large capacitance suppresses a potential change and stabilizes the potential.

In this case, this capacitor with a large capacitance may be formed over the same substrate as a semiconductor device or formed in another element. By forming the capacitor with a large capacitance over the same substrate as the semiconductor device, the number of parts can be reduced. On the other hand, by not forming it over the same substrate as the semiconductor device, a capacitor with a large capacitance can be located.

As a structure different from the above stabilized power supply circuit, explained is the case of controlling the operation of a clock signal supplied to a charge pump by monitoring the output potential of the charge pump so that a voltage is constant.

In other words, as for the clock signal inputted to the charge pump, High potential or Low potential does not necessarily need to be inputted, and for example, when the potential of an output terminal reaches a certain potential, the clock signal may be prevented from being inputted.

Figure 10:
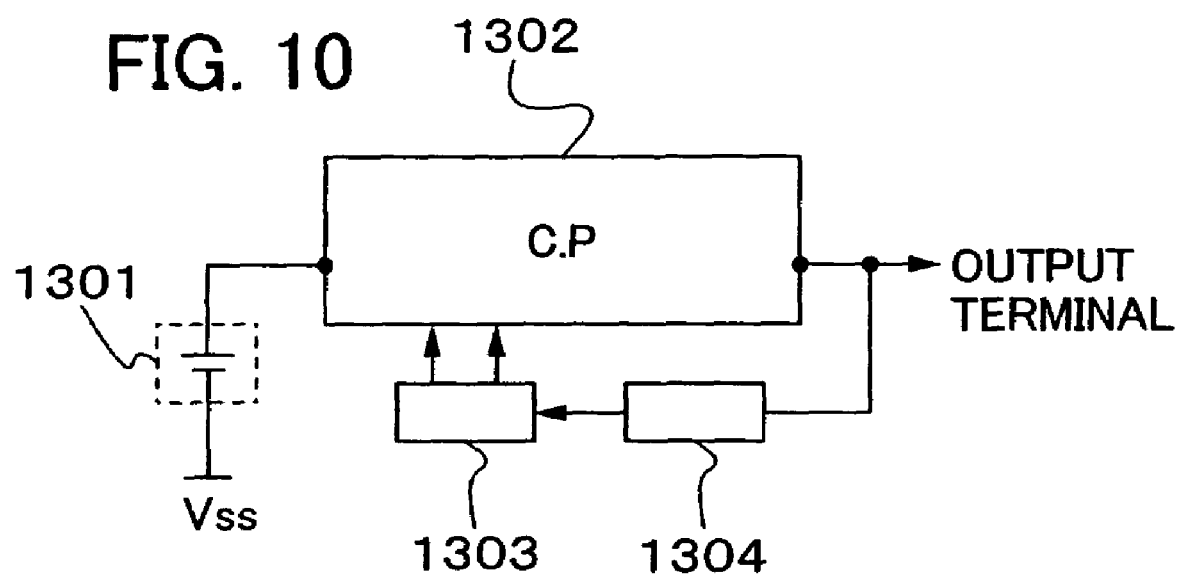
FIG. 10 is a diagram showing a structure of a short ring according to Embodiment Mode 10.

The structure in the case of determining whether a clock signal is inputted or not depending on an output load as described above is explained with reference to FIG. 10.

The voltage of Vdd is supplied from a constant voltage source 1301 to an input terminal of a charge pump 1302, so that a stepped-up potential can be obtained from an output terminal. Here, a potential detection circuit 1304 detects the potential of the output terminal, outputs a control signal when the potential reaches a certain level, and controls a clock signal not to be inputted to the charge pump from a clock pulse generation circuit 1303.

When the clock signal is supplied, an output potential of the charge pump is increased, and when the supply is stopped, the potential increase of the charge pump is stopped. This can be used to control the output potential.

By using such a stabilized power supply circuit, a potential can be stabilized and a predetermined potential can be outputted.

EMBODIMENT MODE 12

Figure 11:
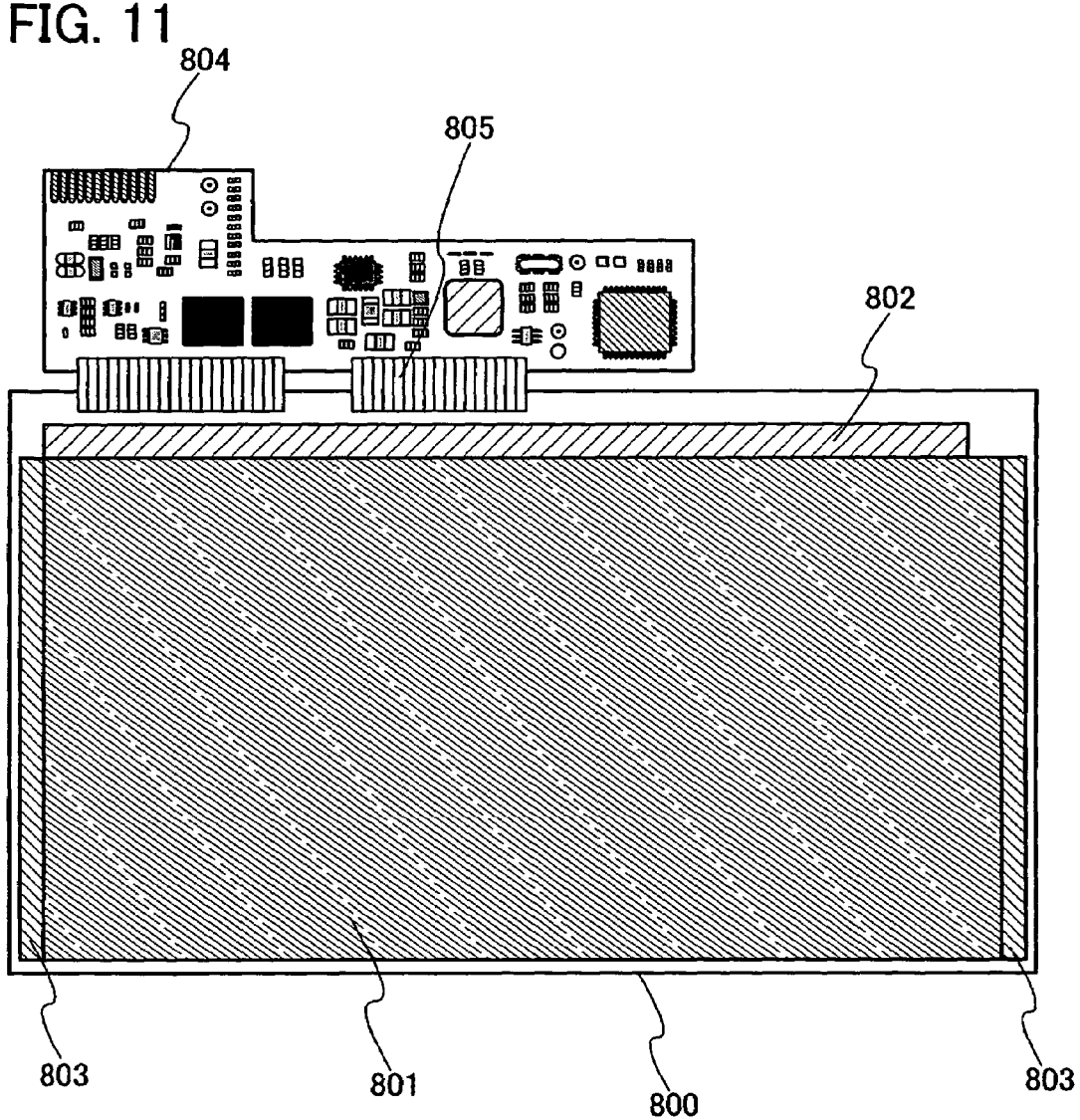
FIG. 11 is a diagram showing a display module according to Embodiment Mode 12.

FIG. 11 shows a display module obtained by combining a display panel 800 and a control circuit 804. The display panel 800 is connected to the control circuit 804 through a connection wiring 805. The display panel 800 includes a pixel portion 801, a signal line driver circuit 802, and a scan line driver circuit 803, and this structure is similar to that shown in FIG. 5B. Various electronic devices can be formed by incorporating such a display module.

EMBODIMENT MODE 13

This embodiment mode describes an example of a cellular phone as an electronic device according to the present invention.

In a cellular phone 900 shown in FIG. 12, a main body (A) 901 including operation switches 904, a microphone 905, and the like is connected by a hinge 910 to a main body (B) 902 including a display panel (A) 908, a display panel (B) 909, a speaker 906, and the like so as to be openable and closable. The display panel (A) 908 and the display panel (B) 909 are stored in a chassis 903 of the main body (B) 902 together with a circuit board 907. Pixel portions of the display panel (A) 908 and the display panel (B) 909 are placed so as to be visible through open windows formed in the chassis 903.

As for the display panel (A) 908 and the display panel (B) 909, the specification such as the number of pixels can be appropriately set in accordance with the functions of the cellular phone 900. For example, the display panel (A) 908 and the display panel (B) 909 can be combined as a main screen and a sub-screen, respectively.

Then, the display panel (A) 908 can be a high-definition color display screen which displays characters and images and the display panel (B) 909 can be a monochrome information display screen which displays textual information. In particular, when the display panel (B) 909 is an active matrix type with higher definition, it can display various types of textual information and improve information display density per screen. For example, when the display panel (A) 908 is a 2- to 2.5-inch QVGA (320 dots × 240 dots) panel with 64 gray scale levels and 260000 colors and the display panel (B) 909 is a monochrome high-definition panel with 2 to 8 gray scale levels and 180 to 220 ppi, Kanji (Chinese characters), the Arabic alphabet, and the like as well as the Roman alphabet, Hiragana (Japanese cursive syllabic characters), and Katakana (Japanese angular syllabic characters) can be displayed.

Each of the display panel (A) 908 and the display panel (B) 909 has a structure similar to those in Embodiment Modes 6 to 9 and 12. In other words, such a display panel does not require the voltage of an external circuit to be stepped up and can achieve reductions in power consumption and circuit area and an improvement in yield because the charge pump circuit described in any of Embodiment Modes 1 to 5 is structured so as to reduce power consumption and conduct certain operation without being affected by variation in threshold voltage among transistors. This contributes to a reduction in power consumption of the cellular phone 900. That enables long continuous use of the cellular phone. Further, since a battery can be downsized, the weight of the cellular phone can be reduced.

The cellular phone 900 can perform display by various driving methods. One example of them is a time gray scale method. According to the time gray scale method, a gray scale is displayed by changing a lighting period of a light emitting element which emits light with constant luminance. For example, if the light emitting element is on during one frame period, the lighting ratio is 100%. If the light emitting element is on for half of the one frame period, the lighting ratio is 50%. When the frame frequency is high to some extent, generally 60 Hz or more, blinking cannot be perceived by human eyes, and it is recognized as a halftone. In this manner, the gray scale can be expressed by changing the lighting ratio.

Figure 13A:
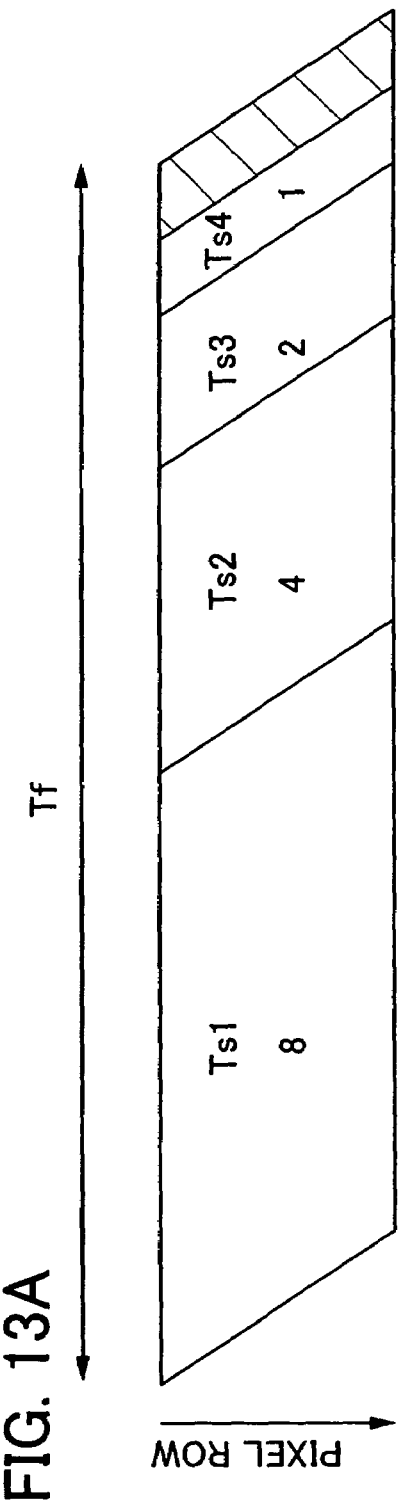
FIGS. 13A and 13B are diagrams illustrating driving methods of the cellular phone according to Embodiment Mode 13.

In FIG. 13A, the horizontal axis shows time and the vertical axis shows a pixel row of a display screen. In this example, writing is sequentially conducted from the top of the display screen, so the display is delayed. Although the writing is sequentially conducted from the top in the example of FIG. 13A, this embodiment mode is not limited thereto. Hereinafter, explanation is provided taking the case of 4 bits as an example.

In FIG. 13A, one frame is divided into four subframes (Ts1, Ts2, Ts3, and Ts4). A ratio of lengths of the subframe periods is Ts1:Ts2:Ts3:Ts4=8:4:2:1. By combining these subframes, the length of lighting period can be set to any of 0 to 15. In this manner, the gray scale can be expressed by dividing one frame into subframes of power of 2. In addition, since the lighting period of Ts4 is short, it is necessary that the upper half of the screen is turned off before the writing of the lower half is completed, and writing and erasing are performed concurrently.

Figure 13B:
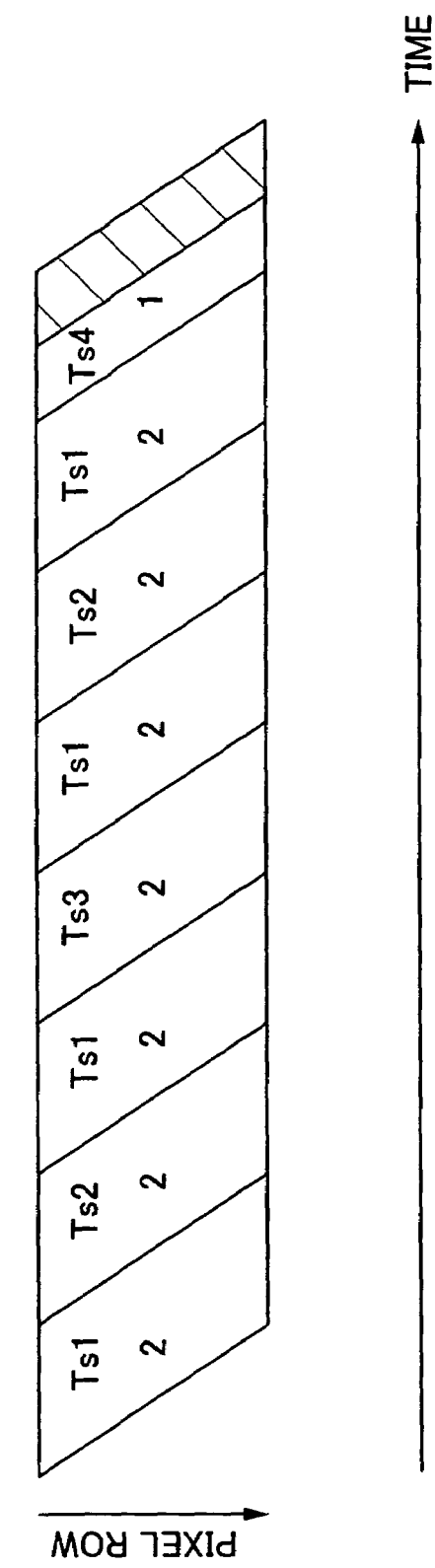

FIG. 13B shows gray scale expression with different time division from FIG. 13A. In the gray scale expression method of FIG. 13A, a defect called a pseudo contour occurs when the higher-order bits are changed. This is because when human eyes see the seventh gray scale level and the eighth gray scale level alternately, they see an illusion where the image is perceived as a different gray scale level from the actual gray scale level. Therefore, in FIG. 13B, the higher-order bits are divided to reduce the above-described pseudo contour phenomenon. Specifically, the highest-order bit (Ts1, here) is divided into four, and arranged in one frame. In addition, the second bit (Ts2, here) is divided into two, and arranged in one frame. In this manner, temporally-long bits are divided, thereby reducing the pseudo contour.

In FIG. 14A, one frame is divided into subframes evenly instead of power of two so that a pseudo contour does not occur. In this method, since there is no temporally-long bit, a pseudo contour does not occur, but the gray scale itself becomes rough. Therefore, gray scale complementation needs to be performed, using FRC (Frame Rate Control), dithering, or the like.

FIG. 14B shows the case of displaying an image with two gray scale levels. In this case, one frame includes only one subframe, so the number of rewritings is once per frame, and power consumption of the controller and the driver can be reduced. As for a cellular phone, the case where textual information such as e-mail is mainly displayed (a mail mode) needs fewer gray scale levels than the case where a moving image or a still image is displayed, so display which prioritizes the power consumption is possible. By combining such display and FIG. 13A, FIG. 13B, FIG. 14A, or the like, the case where a large number of gray scale levels is needed and the case where a small number of gray scale levels is enough can be used separately, so that a reduction in power consumption is possible.

FIG. 14C shows the case where four gray scale levels are expressed, and display is performed by performing writings three times in one frame period. This can be applied to the case of displaying a still image such as a comic for which the number of gray scale levels is preferably larger than the case of displaying textual information. The number of gray scale levels may be set within the range of approximately 4 to 16 gray scale levels.

The power consumption of a cellular phone can be reduced by thus combining a display panel including the charge pump circuit described in any of Embodiment Modes 1 to 5 with a driving method including a natural-image or moving-image mode with 16 or more gray scale levels, a still-image mode with 4 to 16 gray scale levels, and a mail mode with 2 to 8 gray scale levels.

The cellular phone according to this embodiment mode can be modified in various modes in accordance with the functions and the applications thereof. For example, it may be a camera-equipped cellular phone by incorporating an imaging element in the hinge 910. Even when the operation switches 904, the display panel (A) 908, and the display panel (B) 909 are stored in one chassis, the above-described effect can be obtained. Further, a similar effect can be obtained when the structure of this embodiment mode is applied to an information display terminal provided with a plurality of display portions. In addition, the structure according to this embodiment mode can be widely applied to information terminals typified by a computer and a PDA (Personal Digital Assistant) including a display panel and input means such as operation switches, without limitation to the cellular phone.

EMBODIMENT MODE 14

This embodiment mode describes an example of a television set as an electronic device according to the present invention.

Figure 15:
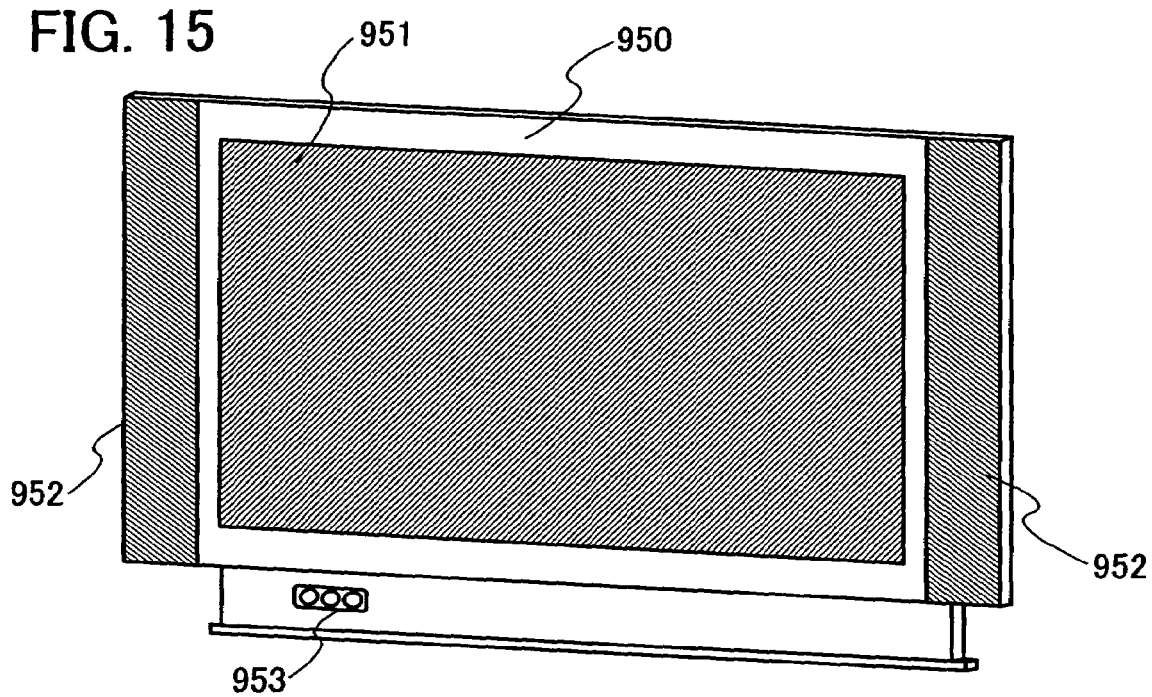
FIG. 15 is a diagram showing a structure of a television set according to Embodiment Mode 14.

FIG. 15 shows a television set according to the present invention, which includes a main body 950, a display portion 951, a speaker portion 952, operation switches 953, and the like. In this television set, the display portion 951 has a structure similar to those described in Embodiment Modes 3 to 7. In other words, such a display portion does not require the voltage of an external circuit to be stepped up and can achieve reductions in power consumption and circuit area and an improvement in yield because the charge pump circuit described in any of Embodiment Modes 1 to 5 is structured so as to reduce power consumption and conduct certain operation without being affected by variation in threshold voltage among transistors. This contributes to a reduction in power consumption of the television set.

With such a feature, the number of power supply circuits can be reduced or the size thereof can be reduced significantly in the television set; therefore, reductions in size, weight, and thickness of the main body 950 can be achieved. A television set, of which power consumption is reduced, image quality is improved, and size and weight are reduced, can provide a product that fits in dwelling environment.

This application is based on Japanese Patent Application serial no. 2005-376634 filed in Japan Patent Office on Dec. 27, 2005, the entire contents of which are hereby incorporated by reference.

What is claimed is:

1. A semiconductor device having a charge pump circuit, the charge pump circuit comprising:
    a first transistor;
    a switch;
    a first capacitor;
    a second capacitor; and
    an inverter,
    wherein an input side of the inverter and a gate electrode of the first transistor are connected to each other,
    wherein one electrode of the first transistor is connected to a first potential,
    wherein an output side of the inverter is connected to the other electrode of the first transistor and one electrode of the switch through the first capacitor,
    wherein the other electrode of the switch is connected to a second potential through the second capacitor,
    wherein the switch includes a second transistor, a third transistor, and a fourth transistor,
    wherein one electrode of the fourth transistor is connected to the second potential,
    wherein the input side of the inverter, a gate electrode of the third transistor, and a gate electrode of the fourth transistor are connected to each other,
    wherein one electrode of the third transistor is connected to one electrode of the second transistor,
    wherein the other electrode of the third transistor is connected to the other electrode of the fourth transistor,
    wherein the one electrode of the second transistor is connected to the first capacitor and the other electrode of the first transistor, and
    wherein the other electrode of the second transistor is connected to the second potential through the second capacitor.

2. The semiconductor device according to claim 1,
wherein the first transistor has n-channel type conductivity, and
wherein the first potential to which the one electrode of the first transistor is connected is a high-level potential.

3. The semiconductor device according to claim 1, wherein the second potential to which the other electrode of the switch is connected through the second capacitor is a low-level potential.

4. The semiconductor device according to claim 1, wherein the switch includes a transistor having n-channel type conductivity or p-channel type conductivity and is normally on when using an n-channel type transistor.

5. The semiconductor device according to claim 1, wherein an output voltage of the charge pump circuit is stepped up.

6. The semiconductor device according to claim 1, wherein the second transistor has n-channel type conductivity and is normally on.

7. The semiconductor device according to claim 1, wherein the third transistor has p-channel type conductivity.

8. The semiconductor device according to claim 1,
wherein the fourth transistor has n-channel type conductivity, and
wherein the second potential to which the one electrode of the fourth transistor is connected is a low-level potential.

9. The semiconductor device according to claim 1, wherein an output voltage of the charge pump circuit is stepped down by setting the first transistor to have p-channel type conductivity and to be normally on, setting the first potential to which the one electrode of the first transistor is connected to a low-level potential, setting the second transistor to have p-channel type conductivity and to be normally on, setting the third transistor to have n-channel type conductivity, setting the fourth transistor to have p-channel type conductivity, and setting the second potential to which the other electrode of the second transistor is connected through the second capacitor to a high-level potential.

10. The semiconductor device according to claim 1, wherein a clock signal is inputted to the inverter.

11. A semiconductor device having a charge pump circuit, the charge pump circuit comprising:
a first transistor;
a switch;
a first capacitor;
a second capacitor; and
a first inverter,
wherein the switch includes a second transistor, a third transistor, a second inverter, a third inverter, a fourth inverter, and a third capacitor,
wherein one electrode of the first transistor is connected to a first potential,
wherein an input side of the first inverter is connected to a gate electrode of the first transistor,
wherein an output side of the first inverter is connected to the other electrode of the first transistor through the first capacitor,
wherein one electrode of the third transistor is connected to the first potential,
wherein an output side of the second inverter is connected to an input side of the fourth inverter and a gate electrode of the third transistor through the third inverter,
wherein an output side of the fourth inverter is connected to the other electrode of the third transistor and a gate electrode of the second transistor through the third capacitor,
wherein one electrode of the second transistor is connected to the other electrode of the first transistor, and
wherein the other electrode of the second transistor is connected to a second potential through the second capacitor.

12. The semiconductor device according to claim 11, wherein the second transistor has p-channel type conductivity.

13. The semiconductor device according to claim 11,
wherein the third transistor has n-channel type conductivity and is normally on, and
wherein the first potential to which the one electrode of the third transistor is connected is a high-level potential.

14. The semiconductor device according to claim 11, wherein an output voltage of the charge pump circuit is stepped up.

15. The semiconductor device according to claim 11, wherein an output voltage of the charge pump circuit is stepped down by setting the first transistor to have p-channel type conductivity and to be normally on, setting the first potential to which the one electrode of the first transistor is connected to a low-level potential, setting the second transistor to have n-channel type conductivity, setting the third transistor to have p-channel type conductivity and to be normally on, and setting the fourth transistor to have n-channel type conductivity.

16. The semiconductor device according to claim 11, wherein a clock signal is inputted to the first inverter.

17. A semiconductor device having a charge pump circuit, the charge pump circuit comprising:
a first transistor;
a switch;
a first capacitor;
a second capacitor; and
a first inverter,
wherein the switch includes a second transistor, a third transistor, a fourth transistor, a second inverter, a third inverter, a fourth inverter, and a third capacitor,
wherein one electrode of the first transistor is connected to a first potential,
wherein an input side of the first inverter is connected to a gate electrode of the first transistor,
wherein an output side of the first inverter is connected to the other electrode of the first transistor through the first capacitor,
wherein one electrode of the third transistor is connected to the first potential,
wherein an output side of the second inverter is connected to an input side of the fourth inverter and a gate electrode of the third transistor through the third inverter,
wherein an output side of the fourth inverter is connected to one electrode of the fourth transistor and a gate electrode of the second transistor through the third capacitor,
wherein one electrode of the second transistor is connected to the other electrode of the first transistor and a gate electrode of the fourth transistor, and
wherein the other electrode of the second transistor is connected to the other electrode of the fourth transistor and connected to a second potential through the second capacitor.

18. The semiconductor device according to claim 17, wherein the second transistor has p-channel type conductivity.

19. The semiconductor device according to claim 17, wherein the third transistor has n-channel type conductivity and is normally on.

20. The semiconductor device according to claim 17, wherein the fourth transistor has p-channel type conductivity.

21. The semiconductor device according to claim 17, wherein an output voltage of the charge pump circuit is stepped up.

22. The charge pump circuit according to claim 17, wherein an output voltage of the charge pump circuit is stepped down by setting the first transistor to have p-channel type conductivity and to be normally on, setting the first potential to which the one electrode of the first transistor is connected to a low-level potential, setting the second transistor to have n-channel type conductivity, setting the third transistor to have p-channel type conductivity and to be normally on, and setting the fourth transistor to have n-channel type conductivity.

23. The semiconductor device according to claim 17, wherein a clock signal is inputted to the first inverter.

* * * * *